United States Patent
Sheppard et al.

(10) Patent No.: US 12,141,823 B2
(45) Date of Patent: Nov. 12, 2024

(54) METHODS AND APPARATUS TO ESTIMATE CENSUS LEVEL IMPRESSION COUNTS AND UNIQUE AUDIENCE SIZES ACROSS DEMOGRAPHICS

(71) Applicant: The Nielsen Company (US), LLC, New York, NY (US)

(72) Inventors: Michael R. Sheppard, Holland, MI (US); DongBo Cui, New York, NY (US); Jake Ryan Dailey, San Francisco, CA (US); Edward Murphy, North Stonington, CT (US); Diane Morovati Lopez, West Hills, CA (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 17/406,858

(22) Filed: Aug. 19, 2021

(65) Prior Publication Data

US 2022/0058662 A1 Feb. 24, 2022

Related U.S. Application Data

(60) Provisional application No. 63/068,179, filed on Aug. 20, 2020.

(51) Int. Cl.
*G06Q 30/0201* (2023.01)
*G06F 16/48* (2019.01)
*G06Q 30/0242* (2023.01)

(52) U.S. Cl.
CPC ......... *G06Q 30/0201* (2013.01); *G06F 16/48* (2019.01); *G06Q 30/0246* (2013.01)

(58) Field of Classification Search
None
See application file for complete search history.

(56) References Cited

U.S. PATENT DOCUMENTS

| 6,108,637 A | 8/2000 | Blumenau |
| 8,370,489 B2 | 2/2013 | Mazumdar et al. |

(Continued)

FOREIGN PATENT DOCUMENTS

| CN | 108140204 A | 6/2018 |
| KR | 101934841 B1 | 1/2019 |

(Continued)

OTHER PUBLICATIONS

International Searching Authority, "Search Report and Written Opinion," issued in connection PCT/US2021/046743, mailed Nov. 29, 2021, 8 pages.

(Continued)

*Primary Examiner* — Michael J Sittner

(57) ABSTRACT

An example apparatus includes an audience size calculator circuitry to determine a first census-level audience size, and an impression count calculator circuitry to determine a first census-level impression count. The example apparatus includes a verification controller circuitry to determine whether the first one of the plurality of cross-demographic total census audience parameter values satisfies a first constraint; determine the first one of the plurality of cross-demographic total census impression parameter values satisfies a second constraint based on the first census-level impression count; and when the first constraint is not satisfied or the second constraint is not satisfied: (a) discard the first one of the cross-demographic total census audience parameter values and the first one of the cross-demographic total census impression parameter values, and (b) select a second one of the cross-demographic total census audience parameter values and a second one of the cross-demographic total census impression parameter values.

20 Claims, 11 Drawing Sheets

(56) References Cited

U.S. PATENT DOCUMENTS

| | | | |
|---|---|---|---|
| 8,572,019 | B2 | 10/2013 | Eggers et al. |
| 8,904,149 | B2 | 12/2014 | Eren et al. |
| 8,930,701 | B2 | 1/2015 | Burbank et al. |
| 9,237,138 | B2 | 1/2016 | Bosworth et al. |
| 9,870,486 | B2 | 1/2018 | Sullivan et al. |
| 9,979,614 | B2 | 5/2018 | Kalus et al. |
| 10,270,673 | B1 | 4/2019 | Sheppard et al. |
| 10,536,358 | B2 | 1/2020 | Sheppard et al. |
| 10,803,475 | B2 | 10/2020 | Rao et al. |
| 11,112,263 | B2 | 9/2021 | Timor et al. |
| 11,276,073 | B2 | 3/2022 | Sheppard et al. |
| 11,308,514 | B2 | 4/2022 | Sheppard et al. |
| 2008/0004958 | A1 | 1/2008 | Ralph et al. |
| 2009/0265215 | A1 | 10/2009 | Lindstrom |
| 2010/0185516 | A1 | 7/2010 | Swanson et al. |
| 2010/0318413 | A1 | 12/2010 | Zinkevich et al. |
| 2013/0097312 | A1 | 4/2013 | Mazumdar et al. |
| 2013/0268351 | A1 | 10/2013 | Abraham et al. |
| 2015/0193816 | A1* | 7/2015 | Toupet ............... G06Q 30/0244 705/14.43 |
| 2015/0244820 | A1 | 8/2015 | Verkasalo et al. |
| 2015/0262207 | A1 | 9/2015 | Rao et al. |
| 2015/0324837 | A1 | 11/2015 | Shimizu et al. |
| 2017/0061470 | A1 | 3/2017 | Sheppard et al. |
| 2018/0332177 | A1 | 11/2018 | Shah et al. |
| 2019/0057403 | A1* | 2/2019 | Sheppard ........... G06Q 30/0201 |
| 2019/0304205 | A1 | 10/2019 | Sheppard et al. |
| 2020/0007919 | A1 | 1/2020 | Sheppard et al. |
| 2020/0228427 | A1 | 7/2020 | Sheppard et al. |
| 2021/0065231 | A1 | 3/2021 | Sheppard et al. |
| 2021/0158376 | A1 | 5/2021 | Sheppard et al. |
| 2022/0058662 | A1 | 2/2022 | Sheppard et al. |
| 2022/0058664 | A1 | 2/2022 | Sheppard et al. |
| 2022/0253895 | A1 | 8/2022 | Sheppard et al. |

FOREIGN PATENT DOCUMENTS

| | | |
|---|---|---|
| WO | 2014059319 | 4/2014 |
| WO | 2017054051 A1 | 4/2017 |

OTHER PUBLICATIONS

A Mathematical Theory of Communication, Wikipedia, Page last edited Sep. 27, 2019, Accessed Jan. 2, 2020, Retrieved from the Internet: <URL: https://en.wikipedia.org/wiki/A_Mathematical_Theory_of_Communication>, 2 pages.

Shannon, C. E., "A Mathematical Theory of Communication," The Bell System Technical Journal, vol. 27, No. 3, pp. 379-423, 623-656, Jul., Oct. 1948, 55 pages.

Entropy (information theory), Wikipedia, Page last edited Dec. 23, 2019, Accessed Jan. 2, 2020, Retrieved from the Internet: <URL: https://en.wikipedia.org/wiki/Entropy_{information_theory)>, 18 pages.

Kullback—Leibler Divergence, Wikipedia, Page last edited Dec. 13, 2019, Accessed Jan. 2, 2020, Retrieved from the Internet: <https://en.wikipedia.org/wiki/Kullback%E2%80%93Leibler_divergence>, 15 pages.

Kullback, S., and Leibler, R.A., "On Information and Sufficiency," The Annals of Mathematical Statistics, vol. 22, No. 1, pp. 79-86, 1951, 8 pages.

Principle of Maximum Entropy, Wikipedia, Page last edited Nov. 8, 2019, Accessed Jan. 2, 2020, Retrieved from the Internet: <URL: https://en.wikipedia.org/wiki/Principle_of_maximum_entropy>, 11 pages.

Jaynes, E.T., "Information Theory and Statistical Mechanics," The Physical Review, vol. 106, No. 4, pp. 620-630, May 15, 1957, 11 pages.

Jaynes, E.T., Probability Theory: The Logic of Science. Cambridge University Press, (2003), Retrieved from the Internet: <URL: http://www.med.mcgill.ca/epidemiology/hanley/bios601/GaussianModel/JaynesProbabilityTheory.pdf>, 758 pages.

Maximum Entropy Probability Distribution, Wikipedia, Page last edited Nov. 11, 2019, Accessed Jan. 2, 2020, Retrieved from the Internet: <URL: hllps://en.wikipedia.org/wiki/Maximum_entropy_probability distribution#Discrete_distributions_with_specified_mean>, 10 pages.

Kapur, J.N., and Kesavan, H.K., "Entropy Optimization Principles with Applications," Academic Press, San Diego CA, 1992, pp. 52-55, 76-97, 307-329, 346-351, 388-395, and 401-405, 37 pages.

Koehler et al., "A Method for Measuring Online Audiences," 2013, Google, Inc., 24 pages.

Dai et al., "Transferring Naive Bayes Classifiers for Text Classification," Department of Computer Science and Engineering, Shanghai Jiao Tong University, Shanghai, China, Proceedings of the 22nd National Conference on Artificial Intelligence, vol. 1, Jul. 22, 2007, 6 pages.

Trzcinski "Analyse, Target & Advertise Privacy in mobile ads," Laboratory for Computer Communications and Applications, EPFL, Lausanne, Switzerland, Jan. 17, 2011, 8 pages.

Coffey "Internet Audience Measurement: A Practitioner's View," Journal of Interactive Advertising, vol. 1 No. 2 (Spring 2001), 8 pages.

Kitts et al., "A Comparison of Algorithms for TV Ad Targeting," 2014 IEEE International Conference on Data Mining Workshop, pp. 296-305, Dec. 1, 2014, 3 pages.

Kapur et al., "Entropy Optimization Principles and Their Applications," in: Singh V.P., Fiorentino M. (eds) Entropy and Energy Dissipation in Water Resources, Water Science and Technology Library, vol. 9., pp. 3-20, Springer, Dordrecht, (1992), 18 pages.

Haggin et al., "Google Nears a Long-Tipped Limit on Tracking 'Cookies,' in Blow to Rivals", Wall St. Journal, 2019, 3 pages.

International Searching Authority, "International Preliminary Report on Patentability," issued Mar. 2, 2023 in connection with International Patent Application No. PCT/US2021/046743, 6 pages.

International Bureau, "International Preliminary Report on Patentability," issued in connection with International Patent Application No. PCT/US2020/047822, dated Mar. 1, 2022, 6 pages.

International Searching Authority, "International Search Report and Written Opinion," issued in connection with International Patent Application No. PCT/US2020/047822, mailed on Dec. 2, 2020, 8 pages.

Kalimeri K., et al., "Predicting Demographics, Moral Foundations, and Human Values from Digital Behaviors," Dec. 5, 2017, 32 Pages.

Li et al., "Entropy Based modelling for Estimating Demographic Trends," PLoS ONE, Sep. 18, 2015, vol. 10, No. 9, e0137324, 19 Pages.

United States Patent and Trademark Office, "Non-Final Office Action," issued in connection with U.S. Appl. No. 16/697,876, dated Mar. 30, 2021, 15 pages.

* cited by examiner

1

METHODS AND APPARATUS TO ESTIMATE CENSUS LEVEL IMPRESSION COUNTS AND UNIQUE AUDIENCE SIZES ACROSS DEMOGRAPHICS

RELATED APPLICATIONS

This patent application claims the benefit of U.S. Provisional Patent Application No. 63/068,179, which was filed on Aug. 20, 2020. U.S. Provisional Patent Application No. 63/068,179 is hereby incorporated herein by reference in its entirety. Priority to U.S. Provisional Patent Application No. 63/068,179 is hereby claimed.

FIELD OF THE DISCLOSURE

This disclosure relates generally to computer processing, and, more particularly, to methods and apparatus to estimate census level impression counts and unique audience sizes across demographics.

BACKGROUND

Tracking user access to digital media has been used by broadcasters and advertisers to determine viewership information for the digital media. Digital media is also known as Internet-accessible media. Tracking viewership of digital media can present useful information to broadcasters and advertisers when determining placement strategies for digital advertising. The success of advertisement placement strategies is dependent on the accuracy that technology can achieve in generating audience metrics.

Figure 1:
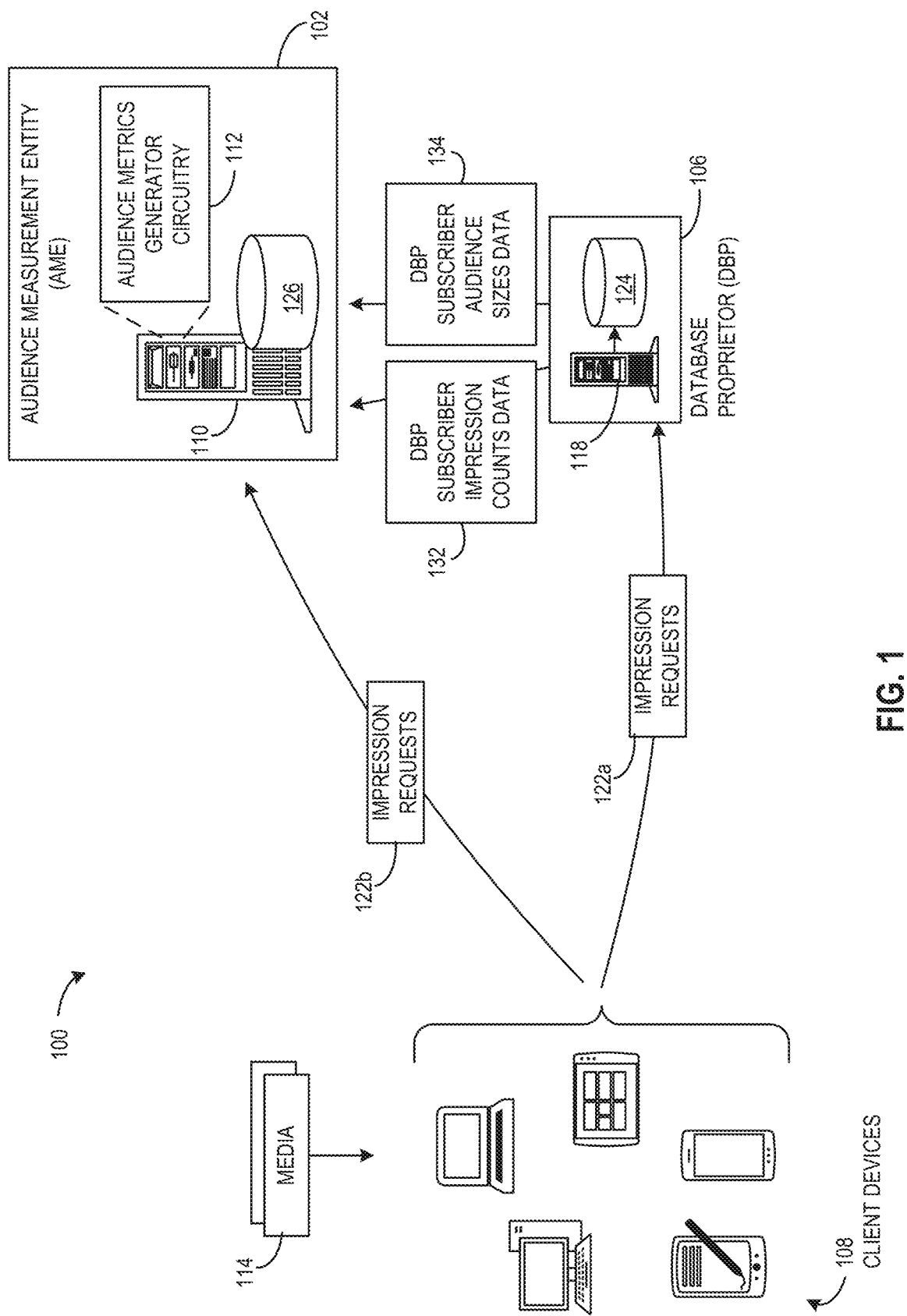
FIG. 1 is an example system for logging impressions of media accessed via client devices.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Techniques for monitoring user access to an Internet-accessible media, such as digital television (DTV) media and digital content ratings (DCR) media, have evolved significantly over the years. Internet-accessible media is also known as digital media. In the past, such monitoring was done primarily through server logs. In particular, entities serving media on the Internet would log the number of requests received for their media at their servers. Basing Internet usage research on server logs is problematic for several reasons. For example, server logs can be tampered with either directly or via zombie programs, which repeatedly request media from the server to increase the server log counts. Also, media is sometimes retrieved once, cached locally and then repeatedly accessed from the local cache without involving the server. Server logs cannot track such repeat views of cached media. Thus, server logs are susceptible to both over-counting and under-counting errors.

The inventions disclosed in Blumenau, U.S. Pat. No. 6,108,637, which is hereby incorporated herein by reference in its entirety, fundamentally changed the way Internet monitoring is performed and overcame the limitations of the server-side log monitoring techniques described above. For example, Blumenau disclosed a technique wherein Internet media to be tracked is tagged with monitoring instructions. In particular, monitoring instructions are associated with the hypertext markup language (HTML) of the media to be tracked. When a client requests the media, both the media and the monitoring instructions are downloaded to the client device. The monitoring instructions are, thus, executed whenever the media is accessed, be it from a server or from a cache. Upon execution, the monitoring instructions cause the client device to send or transmit monitoring information from the client device to a content provider site. The monitoring information is indicative of the manner in which content was displayed.

In some implementations, an impression request or ping request can be used to send or transmit monitoring information by a client device using a network communication in the form of a hypertext transfer protocol (HTTP) request. In this manner, the impression request or ping request reports the occurrence of a media impression at the client device. For example, the impression request or ping request includes information to report access to a particular item of media (e.g., an advertisement, a webpage, an image, video, audio, etc.). In some examples, the impression request or ping request can also include a cookie previously set in the browser of the client device that may be used to identify a user that accessed the media. That is, impression requests or ping requests cause monitoring data reflecting information about an access to the media to be sent from the client device that downloaded the media to a monitoring entity and can provide a cookie to identify the client device and/or a user of the client device. In some examples, the monitoring entity is an audience measurement entity (AME) that did not provide the media to the client device and who is a trusted (e.g., neutral) third party for providing accurate usage statistics (e.g., The Nielsen Company, LLC). Since the AME is a third party relative to the entity serving the media to the client device, the cookie sent to the AME in the impression request to report the occurrence of the media impression at the client device is a third-party cookie. Third-party cookie tracking is used by measurement entities to track access to media accessed by client devices from first-party media servers.

There are many database proprietors operating on the Internet. These database proprietors provide services to large numbers of subscribers. In exchange for the provision of services, the subscribers register with the database proprietors. Examples of such database proprietors include social network sites (e.g., Facebook, Twitter, MySpace, etc.), multi-service sites (e.g., Yahoo!, Google, Axiom, Catalina, etc.), online retailer sites (e.g., Amazon.com, Buy.com, etc.), credit reporting sites (e.g., Experian), streaming media sites (e.g., YouTube, Hulu, etc.), etc. These database proprietors set cookies and/or other device/user identifiers on the client devices of their subscribers to enable the database proprietors to recognize their subscribers when they visit their web sites.

The protocols of the Internet make cookies inaccessible outside of the domain (e.g., Internet domain, domain name, etc.) on which they were set. Thus, a cookie set in, for example, the facebook.com domain (e.g., a first party) is accessible to servers in the facebook.com domain, but not to servers outside that domain. Therefore, although an AME (e.g., a third party) might find it advantageous to access the cookies set by the database proprietors, they are unable to do so.

The inventions disclosed in Mazumdar et al., U.S. Pat. No. 8,370,489, which is incorporated by reference herein in its entirety, enable an AME to leverage the existing databases of database proprietors to collect more extensive Internet usage by extending the impression request process to encompass partnered database proprietors and by using such partners as interim data collectors. The inventions disclosed in Mazumdar accomplish this task by structuring the AME to respond to impression requests from clients (who may not be a member of an audience measurement panel and, thus, may be unknown to the AME) by redirecting the clients from the AME to a database proprietor, such as a social network site partnered with the AME, using an impression response. Such a redirection initiates a communication session between the client accessing the tagged media and the database proprietor. For example, the impression response received at the client device from the AME may cause the client device to send a second impression request to the database proprietor. In response to the database proprietor receiving this impression request from the client device, the database proprietor (e.g., Facebook) can access any cookie it has set on the client to thereby identify the client device based on the internal records of the database proprietor. In the event the client device corresponds to a subscriber of the database proprietor, the database proprietor logs/records a database proprietor demographic impression in association with the user/client device.

As used herein, an impression is defined to be an event in which a home or individual accesses and/or is exposed to media (e.g., an advertisement, content, a group of advertisements and/or a collection of content). In Internet media delivery, a quantity of impressions or impression count is the total number of times media (e.g., content, an advertisement, or advertisement campaign) has been accessed by a web population (e.g., the number of times the media is accessed). In some examples, an impression or media impression is logged by an impression collection entity (e.g., an AME or a database proprietor) in response to an impression request from a user/client device that requested the media. For example, an impression request is a message or communication (e.g., an HTTP request) sent by a client device to an impression collection server to report the occurrence of a media impression at the client device. In some examples, a media impression is not associated with demographics. In non-Internet media delivery, such as television (TV) media, a television or a device attached to the television (e.g., a set-top-box or other media monitoring device) may monitor media being output by the television. The monitoring generates a log of impressions associated with the media displayed on the television. The television and/or connected device may transmit impression logs to the impression collection entity to log the media impressions.

A user of a computing device (e.g., a mobile device, a tablet, a laptop, etc.) and/or a television may be exposed to the same media via multiple devices (e.g., two or more of a mobile device, a tablet, a laptop, etc.) and/or via multiple media types (e.g., digital media available online, digital TV (DTV) media temporality available online after broadcast, TV media, etc.). For example, a user may start watching the Walking Dead television program on a television as part of TV media, pause the program, and continue to watch the program on a tablet as part of DTV media. In such an example, the exposure to the program may be logged by an AME twice, once for an impression log associated with the television exposure, and once for the impression request generated by a tag (e.g., census measurement science (CMS) tag) executed on the tablet. Multiple logged impressions associated with the same program and/or same user are defined as duplicate impressions. Duplicate impressions are problematic in determining total reach estimates because one exposure via two or more cross-platform devices may be counted as two or more unique audience members. As used herein, reach is a measure indicative of the demographic coverage achieved by media (e.g., demographic group(s) and/or demographic population(s) exposed to the media). For example, media reaching a broader demographic base will have a larger reach than media that reached a more limited demographic base. The reach metric may be measured by tracking impressions for known users (e.g., panelists or non-panelists) for which an audience measurement entity stores demographic information or can obtain demographic information. Deduplication is a process that is necessary to adjust cross-platform media exposure totals by reducing (e.g., eliminating) the double counting of individual audience members that were exposed to media via more than one platform and/or are represented in more than one database of media impressions used to determine the reach of the media.

As used herein, a unique audience is based on audience members distinguishable from one another. That is, a particular audience member exposed to particular media is measured as a single unique audience member regardless of how many times that audience member is exposed to that particular media or the particular platform(s) through which the audience member is exposed to the media. If that particular audience member is exposed multiple times to the same media, the multiple exposures for the particular audience member to the same media is counted as only a single unique audience member. In this manner, impression performance for particular media is not disproportionately represented when a small subset of one or more audience members is exposed to the same media an excessively large number of times while a larger number of audience members is exposed fewer times or not at all to that same media. By tracking exposures to unique audience members, a unique audience measure may be used to determine a reach measure to identify how many unique audience members are reached by media. In some examples, increasing unique audience and, thus, reach, is useful for advertisers wishing to reach a larger audience base.

Notably, although third-party cookies are useful for third-party measurement entities in many of the above-described techniques to track media accesses and to leverage demographic information from third-party database proprietors, use of third-party cookies may be limited or may cease in some or all online markets. That is, use of third-party cookies enables sharing anonymous subscriber information (without revealing personally identifiable information (PII)) across entities which can be used to identify and deduplicate audience members across database proprietor impression data. However, to reduce or eliminate the possibility of revealing user identities outside database proprietors by such anonymous data sharing across entities, some websites, internet domains, and/or web browsers will stop (or have already stopped) supporting third-party cookies. This will make it more challenging for third-party measurement entities to track media accesses via first-party servers. That is, although first-party cookies will still be supported and useful for media providers to track accesses to media via their own first-party servers, neutral third parties interested in generating neutral, unbiased audience metrics data will not have access to the impression data collected by the first-party servers using first-party cookies. Examples disclosed herein may be implemented with or without the availability of third-party cookies because, as mentioned above, the datasets used in the deduplication process are generated and provided by database proprietors, which may employ first-party cookies to track media impressions from which the datasets are generated.

Examples disclosed herein estimate total unique audience sizes and impression counts of a universe audience for media based on census-level audience metrics information collected by an AME that includes census-level impression counts and/or unique total audience sizes but does not include how the census-level impression counts and audience sizes are distributed across demographics. As used herein, a universe audience (also referred to as a total audience) for media is a total number of unique persons that accessed the media in a particular geographic scope of interest for audience metrics, via one or more websites/webpages, via one or more internet domains, and/or during a duration of interest for the audience metrics. Example geographic scopes of interest could be a city, a metropolitan area, a state, a country, etc. As used herein, a census-level impression (e.g., a census impression) is an impression that is logged for an access to media by a user for which demographic information is unknown. Thus, a census-level impression is indicative of an access to media but not indicative of the audience member to which the access should be attributed. As such, census-level impressions are logged as anonymous accesses to media by an AME to generate impression counts for media. Since the census-level impressions are anonymous, they are not directly indicative of total unique audience sizes because multiple census-level impression counts may be attributed to the same person (e.g., the same person visits the same website multiple times and/or visits multiple different websites that present the same advertisement, and each presentation of that advertisement is reported as a separate impression, albeit for the same person). However, in some examples, an AME is able to deduplicate impressions counts for the same person in order to determine a census-level total audience size. For example, if there are multiple census-level impressions counts attributed to the same person, the AME can use methods to deduplicate those counts towards the audience size (e.g., the audience size is increased only once for all of that person's impression counts and not once for each impression count individually). Examples disclosed herein are able to determine total census-level audience size in accordance with the logged census-level impression counts.

Examples disclosed herein also leverage database proprietor subscriber-level audience metrics information that provides partial information on impression counts and unique audience sizes. For example, a database proprietor may collect database proprietor subscriber-level audience metrics information based on media accesses by subscribers of services provided by the database proprietors. Since the database proprietors store user information about their subscribers, the database proprietors can log demographic impressions. As used herein, a demographic impression associates user demographics of a subscriber with a logged impression of media accessed by that subscriber. Using demographic impressions, the database proprietor generates the database proprietor subscriber-level audience metrics.

The AME may enter into an agreement or partnership with one or more database proprietors to obtain access to demographic impression data from subscribers of the database proprietors. However, to protect PII of their subscribers, database proprietors generalize their subscriber-level audience metrics information to aggregate data (e.g., database proprietor aggregate subscriber-based audience metrics information) by generating impression counts and unique audience sizes per demographic category (e.g., females 13-18, males 13-18, females 19-23, males 19-23, etc.). Examples disclosed herein use that database proprietor aggregate subscriber-based audience metrics information to estimate individual demographic-level impression counts and unique audience sizes for the AME-collected census impressions. Prior techniques for determining total census-level impression counts and/or census-level audience sizes involve using scaling factors, adjustment factors, and/or duplication factors. However, such factors need to be regularly updated, and special criteria need to be applied when estimates exceed a universe estimate.

In the context of generating digital advertising ratings (e.g., using media tagging techniques such as embedding beacon instructions in internet-accessible media), known accurate information can be collected about the number of times a particular advertisement was accessed (e.g., an impression count). In some examples, the audience information can be collected in connection with the particular advertisement. However, audience information on how the audience and impression count is distributed across multiple demographics are unknown. Beacon instructions embedded in media cause a browser to report impressions by sending cookies to a database proprietor that matches the cookies with its database of subscriber information. In this manner, the database proprietor logs demographic impressions associating demographics from subscriber accounts or profiles corresponding to the received cookies of the browser-reported impressions. As not everyone may be a subscriber of the database proprietor, all of the impressions pertaining to a non-subscriber are lost or unusable by the database proprietor to generate demographic impressions. Additionally, only a partial set of impressions may be collected for known users due to possibly those users deleting their cookies in their browsers or due to using public computers in which cookies are disabled or are set in browsers without definitive corresponding users. What is returned is an aggregate summary statistic of how many people in each demographic the database proprietor measured, and how many of their impressions those people accounted for from the total which includes unknown audience members. Examples disclosed herein leverage the database proprietor data to determine census-level impressions counts and/or census-level audience sizes across multiple demographic groups.

Table 1 below is a summary representation of the unknown aggregate data of audience sizes and impression counts within each demographic.

TABLE 1

| Demo | Population | Database Proprietor | | Census | |
|---|---|---|---|---|---|
| | | Audience | Impressions | Audience | Impressions |
| 1 | $U_1$ | $A_1$ | $R_1$ | $X_1$ | $T_1$ |
| 2 | $U_2$ | $A_2$ | $R_2$ | $X_2$ | $T_2$ |
| ... | ... | ... | ... | ... | ... |
| k Total | $U_k$ | $A_k$ | $R_k$ | $X_k$ | $T_k$ |

As shown in Table 1 above, the census-level audience size data and census-level impressions count data within each demographic are labeled $\{X_k, T_k\}$ respectively, wherein the subscript k is a demographic index. As used herein, a demographic index is a numerical value assigned to a demographic category. For example, a demographic index of k=1 may correspond to females 18-25 years old, and a demographic index of k=2 may correspond to males 18-25 years old. In examples disclosed herein, the demographic level census values are unknown. As used herein, unknown is defined to be values that are not included in the census-level audience metrics information collected by the AME. However, the database proprietor information is known. As used herein, known is defined to be values that are included in the census-level audience metrics information collected by the AME. In examples disclosed herein, subscribers of the database proprietor form a database proprietor panel of audience members and a database of subscriber account information maintained by the database proprietor stores PII of the database subscribers/panelists. The database proprietor audience size data and database proprietor impressions counts data are labeled $\{A_k, R_k\}$ respectively, and this data is known. In Table 1 above, $R_k$ represents the recorded impression counts from the database proprietor for the $k^{th}$ demographic, $A_k$ represents the recorded audience sizes from the database proprietor for the k* demographic, $T_k$ represents the census impression counts for the $k^{th}$ demographic, $X_k$ represents the census audience sizes for the $k^{th}$ demographic, and $U_k$ represents the universe estimate for the $k^{th}$ demographic. The universe estimate (U.) is the estimated number of people (population) that are able to access an item of media regardless of whether they did or did not access the monitored media. People in the universe estimate could potentially be part of a unique audience size (A, X) if they access the media. Additionally, in Table 1 above, the variables with bullet point subscripts (e.g., U., A., R., X., and T.) are representative of totals across all demographics for that respective variable. For example, the variable T. is defined as $$T. = \sum_{k=1}^{K} T_k$$

and likewise for the other variables. For a single demographic campaign, the totals reduce to those values of the respective variables of that single demographic.

Examples disclosed herein determine demographic-level census audience size and impressions count data based on any combination of whether the total census impression count is known and/or the total census audience size is known. In examples disclosed herein, the number of audience members (e.g., audience size) (X) in each demographic group (k) and the impression count (T) for each demographic group (k) are unknown. As demographic groups are assumed to be mutually exclusive, the respective rows of Table 1 added together equal the totals. Examples disclosed herein estimate demographic distributions of census impression counts ($T_k$) and audience sizes ($X_k$) corresponding to unknown audience members in a way such that the distribution of demographic impression counts ($T_k$) account for the total census impression counts (T.) (e.g., $$\sum_{k=1}^{K} T_k = T).$$

and/or in a way such that the distribution of demographic audience sizes ($X_k$) account for the total census audience size (X.) (e.g., $$\sum_{k=1}^{K} X_k = X.).$$

The estimated demographic distributions determined using examples disclosed herein also follow logical constraints of the underlying given information (e.g., sum of demographic impression counts does not exceed given total census impressions and/or sum of demographic audience sizes does not exceed given total census audience). Although examples disclosed herein are described with impressions of media, examples disclosed herein may be similarly used to measure visits to a store, views on a video, items of wine purchased, etc. as long as it is a counting variable and the database proprietor information is partial information of those counts among the same people in the collected census information. In examples disclosed herein, estimates of impression counts and audience sizes are determined across categorical groups of demographics. Example demographics can include geographic regions, age, gender, income, marital status, etc. However, the partitioning across categorical groups can be any mutually exclusive categories, not necessarily demographics. Such categorical groups could be product preferences, shopping habits, shopper loyalty program memberships, food preferences, media genre preferences, vehicle type ownership, sports team loyalty, health information, medical information, etc. The key assumption is that the categories are mutually exclusive, and that each person belongs to one and only one of the category partitions.

Examples disclosed herein show how to solve for any combination of unknowns across Table 1 above, subject to any linear constraints, and following all logical consequences of the problem. Examples disclosed herein pertain to when only the collection of census impression counts ($T_k$) and census audience sizes ($X_k$) are unknown and when the total census impression counts of T. and/or the total census audience sizes of X. is known. In examples disclosed herein, the census impression counts ($T_k$) and the census audience sizes ($X_k$) are all solved simultaneously.

In prior techniques, there is some assumed parametric model for the true census distribution of impression counts, such as the Negative Binomial or a modification thereof. In prior techniques, a loss mechanism model is incorporated, such as a Beta-Binomial mechanism, in which some or all of the true census impressions are lost and what remains is what is recorded in the database. Maximum Likelihood estimation would then be used in the prior techniques to model the parameters of the Negative Binomial and Beta-Binomial parameters, such that the estimate of the census distribution can be known.

With multiple demographic groups, the parameters of the census distribution model may have to vary from demographic group to demographic group. For example, if there were two parameters for each demographic group (e.g., a demographic category) and there were ten demographic groups, there would be twenty different parameters that would have to be fixed. Likewise, the loss-mechanism may vary from demographic group to demographic group. As more demographic groups are added, there are more parameters that must be estimated, which may be computationally or practically impossible to implement using prior techniques.

Examples disclosed herein overcome computation challenges, inaccuracies, and/or logical inconsistencies of prior techniques. Examples disclosed herein do not need to a priori assume any census distribution or loss mechanism, or any parametric model. Examples disclosed herein use information provided in Table 1 above, namely aggregate database proprietor information of audience sizes and impressions counts. In examples disclosed herein, the audience sizes and impression counts are based on impressions of media attributable to subscribers of a database proprietor.

In examples disclosed herein, at most only two variables (e.g., a cross-demographic total census audience parameter value ($c_1$) and a cross-demographic total census impression parameter value ($c_2$)) need to be solved independent of the actual number of demographic categories. Examples disclosed herein include four distinct combinations of the aggregated total census constraints between audience and impressions (e.g., both the total census audience constraint (X.) and the total impression constraint (T.) are known, the total census audience constraint (X.) is known and the total census impression constraint (T.) is unknown, the total census impression constraint (T.) is known and the total census audience constraint (X.) is unknown, and both the total census audience constraint (X.) and the total impressions constraint (T.) are unknown). In addition, total unique audience sizes estimated as disclosed herein are logically consistent with all constraints of an audience estimation problem, and the disclosed procedure is optimal in regards to information theory.

Although examples disclosed herein are described in association with audience metrics related to media impressions and unique audience sizes, examples disclosed herein may be similarly used for other applications to determine population sizes, number of people, number of customers, number of attendees, number of observations in biological matters, etc. The datasets themselves need not be impression counts and/or audience sizes. They could be, for example, related to bank accounts, lists of purchased items, store visits, traffic patterns, biological specimens, etc. The datasets could be represented as lists of numbers or any other information.

FIG. 1 shows an example operating environment 100 that includes an example audience measurement entity (AME) 102, an example database proprietor A 106, and example client devices 108. The example AME 102 includes an example AME computer 110 that implements example audience metrics generator circuitry 112 to estimate total unique audience sizes based on census-level media impressions logged by the AME 102 and/or census-level total audience sizes logged by the AME 102 and based on database proprietor (DBP) aggregate subscriber-based audience metrics information provided by the database proprietor 106. In the illustrated example of FIG. 1, the AME computer 110 may also implement an impression monitor system to log media impressions reported by the client devices 108. In the illustrated example of FIG. 1, the client devices 108 may be stationary or portable computers, handheld computing devices, smart phones, Internet appliances, and/or any other type of device that may be connected to the Internet and capable of presenting media.

As used herein, an audience size is defined as a number of deduplicated or unique audience members exposed to a media item of interest for audience metrics analysis. A deduplicated or unique audience member is one that is counted only once as part of an audience size. Thus, regardless of whether a particular person is detected as accessing a media item once or multiple times, that person is only counted once in the audience size for that media item. Audience size may also be referred to as unique audience or deduplicated audience.

As used herein, a media impression is defined as an occurrence of access and/or exposure to media 114 (e.g., an advertisement, a movie, a movie trailer, a song, a web page banner, a webpage, etc.). Examples disclosed herein may be used to monitor for media impressions of any one or more media types (e.g., video, audio, a webpage, an image, text, etc.). In examples disclosed herein, the media 114 may be content and/or advertisements. Examples disclosed herein are not restricted for use with any particular type of media. On the contrary, examples disclosed herein may be implemented in connection with tracking impressions for media of any type or form.

In the illustrated example of FIG. 1, content providers and/or advertisers distribute the media 114 via the Internet to users that access websites and/or online television services (e.g., web-based TV, Internet protocol TV (IPTV), etc.). In some examples, the media 114 is served by media servers of the same internet domains as the database proprietor 106. For example, the database proprietor 106 includes a database proprietor server 118 that can serve media 114 to its corresponding subscribers via the client devices 108. Examples disclosed herein can be used to generate audience metrics data that measures audience sizes of media served by the database proprietor 106 and/or any other entity. For example, the database proprietor 106 may use such audience metrics data to promote its online media serving services (e.g., ad server services, media server services, etc.) to prospective clients. By showing audience metrics data indicative of audience sizes drawn by the database proprietor 106, the database proprietor 106 can sell its media serving services to customers interested in delivering online media to users.

The media 114 is then presented via the client devices 108. When the media 114 is accessed by the client devices 108, the client devices 108 send impression requests 122a to the database proprietor server 118 to inform the database proprietor server 118 of the media accesses. In this manner, the database proprietor server 118 can log media impressions in impression records of a database proprietor audience metrics database 124. In some examples, the client devices 108 also send impression requests 122b to the AME 102 so that the AME 102 can log census impressions in an AME audience metrics database 126. In the illustrated example of FIG. 1, the database proprietor 106 logs demographic impressions corresponding to accesses by the client devices 108 to the media 114. Demographic impressions are impressions logged in association with demographic information collected by the database proprietor 106 from registered subscribers of its services. Also, in the illustrated example of FIG. 1, the AME computer 110 logs census-level media impressions corresponding to accesses by client devices 108 to media 114. Census-level media impressions (e.g., census impressions) are impressions logged regardless of whether demographic information is known for those logged impressions. In some examples, the AME computer 110 also logs census-level audience size(s) corresponding to accesses by client device 108 to media 114. A census-level audience size (e.g., census audiences) indicates a quantity of audience members attributable to the census impressions regardless of whether demographic information is known for those audience members. In some examples, the AME computer 110 deduplicates the census-level audience size (e.g., an audience member corresponding to multiple impressions in the census impressions is counted only once in the census-level audience size regardless of the number of impressions attributable to that audience member).

In some examples, the media 114 is encoded to include a media identifier (ID). The media ID may be any identifier or information that can be used to identify the corresponding media 114. In some examples the media ID is an alphanumeric string or value. In some examples, the media ID is a collection of information. For example, if the media 114 is an episode, the media ID may include program name, season number, and episode number. When the media 114 includes advertisements, such advertisements may be content and/or advertisements. The advertisements may be individual, standalone advertisements and/or may be part of one or more ad campaigns. The advertisements of the illustrated example are encoded with identification codes (e.g., data) that identify the associated ad campaign (e.g., campaign ID, if any), a creative type ID (e.g., identifying a Flash-based ad, a banner ad, a rich type ad, etc.), a source ID (e.g., identifying the ad publisher), and/or a placement ID (e.g., identifying the physical placement of the ad on a screen). In some examples, advertisements tagged with the monitoring instructions are distributed with Internet-based media content such as, for example, web pages, streaming video, streaming audio, IPTV content, etc. As noted above, methods, apparatus, systems, and/or articles of manufacture disclosed herein are not limited to advertisement monitoring but can be adapted to any type of media monitoring (e.g., web pages, movies, television programs, etc.).

In some examples, the media 114 of the illustrated example is tagged or encoded to include monitoring instructions or tag instructions, which are computer executable instructions (e.g., Java, java script, or any other computer language or script) that are executed by web browsers that access the media 114 via, for example, the Internet. Execution of the monitoring instructions causes the web browser to send the impression requests 122a,b (e.g., also referred to as tag requests) to one or more specified servers of the AME 102 and/or the database proprietor 106. As used herein, tag requests 122a,b are used by the client devices 108 to report occurrences of media impressions caused by the client devices 108 accessing the media 114. In the illustrated example, the tag requests 122a include user-identifying information that the database proprietor 106 can use to identify the subscriber that accessed the media 114. For example, when a subscriber of the database proprietor 106 logs into a server of the database proprietor 106 via a client device 108, that server of the database proprietor 106 sets a database proprietor cookie on the client device 108 and maps that cookie to the subscriber's identity/account information at the database proprietor server 118. In examples disclosed herein, subscriber identity and/or subscriber account information includes personally identifiable information (PII) such as full name, street address, residence city and state, telephone numbers, email addresses, ages, dates of birth, social security numbers, demographic information, and/or any other personal information provided by subscribers in exchange for services from the database proprietor 106. By having such PII information mapped to database proprietor cookies, the database proprietor 106 can subsequently identify the subscriber based on the database proprietor cookie to determine when that user accessed different media 114 and to log an impression in association with demographics and/or other PII information of that user. In the illustrated example of FIG. 1, the impression requests 122a include database proprietor cookies of the client devices 108 to inform the database proprietor 106 of the particular subscribers that accessed the media 114. In some examples, the AME 102 also sets AME cookies in the client devices 108 to identify users that are enrolled in an AME panel of the AME 102 such that the AME 102 collects PII information of people that enroll in the panel by agreeing to having their internet activities monitored by the AME 102.

The tag requests 122a,b may be implemented using HTTP requests. However, whereas HTTP requests are network communications that traditionally identify web pages or other resources to be downloaded, the tag requests 122a,b of the illustrated example are network communications that include audience measurement information (e.g., ad campaign identification, media identifier, and/or user identification information) as their payloads. The server (e.g., the AME computer 110 and/or the database proprietor server 118) to which the tag requests 122a,b are directed is programmed to log occurrences of impressions reported by the tag requests 122a,b. Further examples of monitoring instructions (e.g., beacon instructions) and uses thereof to collect impression data are disclosed in U.S. Pat. No. 8,370,489 entitled "Methods and Apparatus to Determine Impressions using Distributed Demographic Information," which is hereby incorporated herein by reference in its entirety.

In other examples in which the media 114 is accessed by apps on mobile devices, tablets, computers, etc. (e.g., that do not employ cookies and/or do not execute instructions in a web browser environment), an app publisher (e.g., an app store) can provide a data collector (e.g., a software program or library to collect data) in an install package of an app for installation at the client devices 108. When a client device 108 downloads the app and consents to the accompanying data collector being installed at the client device 108 for purposes of audience/media/data analytics, the data collector can detect when the media 114 is accessed at the client device 108 and causes the client device 108 to send one or more of the impression requests 122a,b to report the access to the media 114. In such examples, the data collector can obtain user identifiers and/or device identifiers stored in the client devices 108 and send them in the impression requests 122a,b to enable the database proprietor 106 and/or the AME 102 to log impressions. Further examples of using a collector in client devices to collect impression data are disclosed in U.S. Pat. No. 8,930,701 entitled "Methods and Apparatus to Collect Distributed User Information for Media Impressions and Search Terms," and in U.S. Pat. No. 9,237,138 entitled "Methods and Apparatus to Collect Distributed User Information for Media Impressions and Search Terms," both of which are hereby incorporated herein by reference in their entireties.

In the illustrated example, the database proprietor 106 collaborates with the AME 102 so that the AME 102 can operate as an independent party that measures and/or verifies audience measurement information pertaining to the media 114 accessed by the subscribers of the database proprietor 106. However, the database proprietor 106 does so while protecting the privacies of its subscribers by not sharing or revealing subscriber identities, subscriber information, and/or any other subscriber PII information to outside parties. In examples disclosed herein, to share impression data with the AME 102 without revealing subscriber identities, subscriber information, and/or any other subscriber PII information, the database proprietor 106 processes its collected subscriber-level audience metrics information to generate database proprietor aggregate subscriber-based audience metrics information. In the example of FIG. 1, database proprietor aggregate subscriber-based audience metrics information is shown as example database proprietor subscriber impression counts data 132 and example database proprietor subscriber audience sizes data 134. The example database proprietor subscriber impression counts data 132 includes impression counts in the aggregate (e.g., no user-identifying PII data) per demographic category (e.g., a demographic group) for one or more media items of interest. The example database proprietor subscriber audience sizes data 134 includes unique audience sizes in the aggregate (e.g., no user-identifying PII data) per demographic category for one or more media items of interest.

Figure 2:
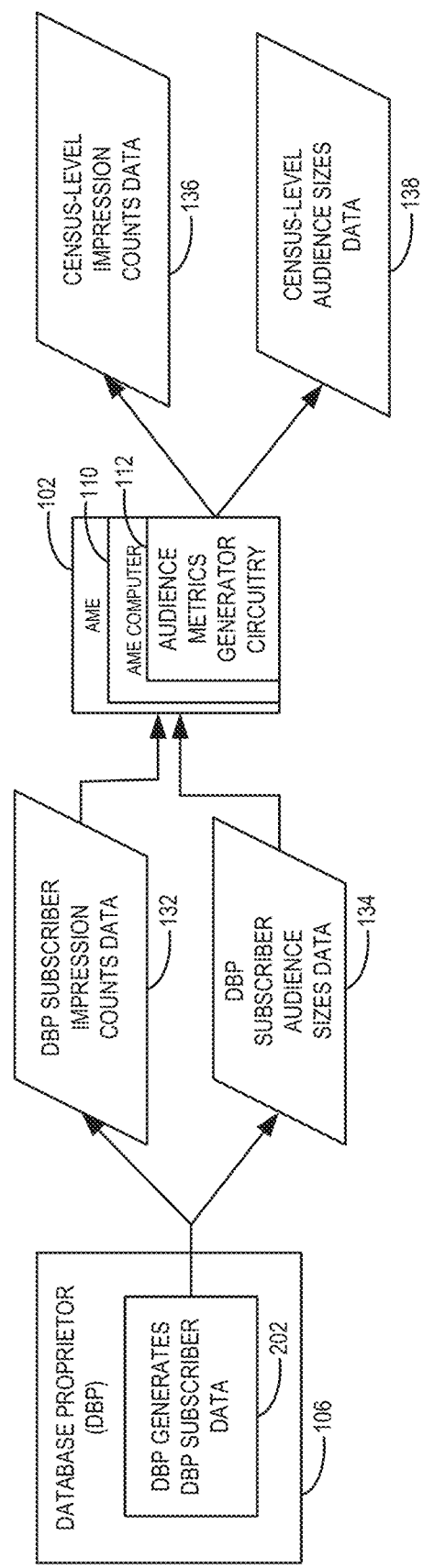
FIG. 2 is a schematic illustration of an example process flow of a database proprietor and an audience measurement entity to estimate census-level impression count data and census-level unique audience size data across multiple demographics based on subscriber impression count data and subscriber unique audience size data for the multiple demographics.

FIG. 2 is an example process flow of the database proprietor 106 and the AME 102 to estimate census-level impression counts and census-level unique audience sizes for media across multiple demographic categories based on the database proprietor subscriber impression counts data 132 and the database proprietor subscriber audience sizes data 134. The example process flow of FIG. 2 begins when the database proprietor 106 generates database proprietor subscriber-level audience metrics data 202 based on logging impressions of the media 114 (FIG. 1) accessed by subscribers of the database proprietor 106. The example database proprietor 106 then anonymizes the subscriber-level audience metrics data 202 by aggregating it by demographic category to generate the database proprietor subscriber impression counts data 132 and the database proprietor subscriber audience sizes data 134. In this example, the database proprietor 106 sends the database proprietor subscriber impression counts data 132 and the database proprietor subscriber audience sizes data 134 to the example audience metrics generator circuitry 112 of the AME 102. The example audience metrics generator circuitry 112 utilizes the database proprietor subscriber impression counts data 132 and the database proprietor subscriber audience sizes data 134 as inputs to estimate census-level impression counts data 136 and census-level audience sizes data 138.

Figure 3:
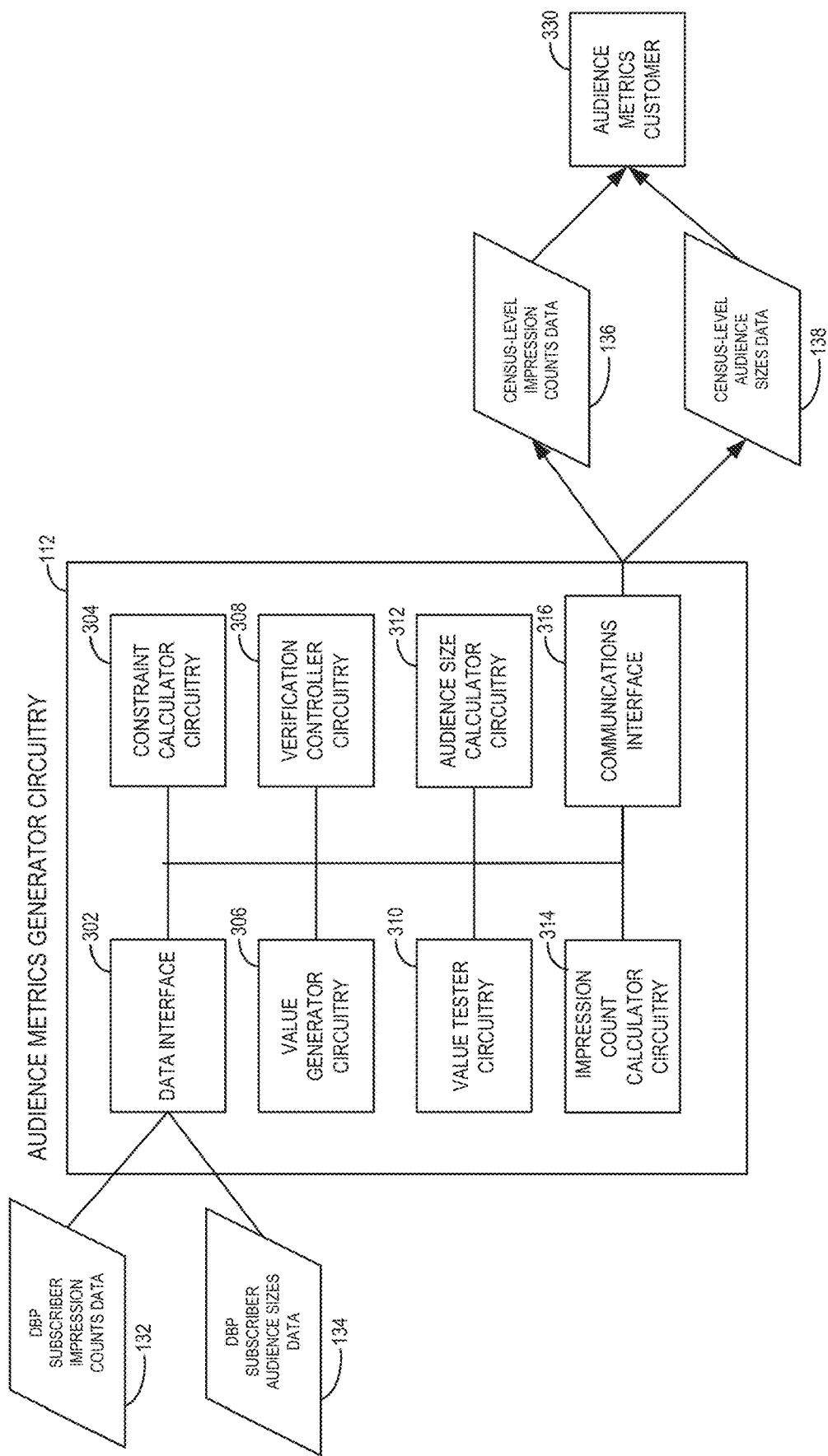
FIG. 3 is a block diagram of the example audience metrics generator circuitry of FIGS. 1 and 2 to estimate census-level impression count data and census-level unique audience size data across multiple demographics from subscriber impression count data and subscriber unique audience size data for the multiple demographics in accordance with teachings of this disclosure.

FIG. 3 is a block diagram of the example audience metrics generator circuitry 112 of FIGS. 1 and 2 that may be used to estimate the census-level impression counts data 136 and the census-level audience size data 138 of FIG. 2 based on the database proprietor subscriber impression counts data 132 and the database proprietor subscriber audience sizes data 134 of FIGS. 1 and 2.

The audience metrics generator circuitry 112 is provided with an example data interface 302 to access the database proprietor subscriber impression counts data 132 and the database proprietor subscriber audience sizes data 134 (e.g., in memory and/or in one or more network communications). The audience metrics generator circuitry 112 is provided with example constraint calculator circuitry 304 to determine if the census-level total impressions count and/or the census-level total audience size is/are known. In some examples, the constraint calculator circuitry 304 determines if the AME 102 collected the census-level total impression count (T.) and/or the census-level total audience size (X.). The example constraint calculator circuitry 304 sets the census-level total audience size (X.) to the audience size collected by the AME 102 and the census-level total impression count (T.) to the impression count collected by the AME 102. In some examples, the constraint calculator circuitry 304 determines if the value generator circuitry 306 needs to calculate a cross-demographic total census audience parameter value and/or a cross-demographic total census impression parameter value based on if the census-level total impression count (T.) and/or the census-level total audience size (X.) is/are known. In some examples, the constraint calculator circuitry 304 determines if the verification controller circuitry 308 needs to verify that the estimated census-level audience size data and/or the estimated census-level impression count data are logically consistent with the census-level total impression count (T.) and/or the census-level total audience size (X.) based on if the census-level total impression count (T.) and/or the census-level total audience size (X.) are known (e.g., collected by the AME 102).

The audience metrics generator circuitry 112 is provided with example value generator circuitry 306 to calculate a cross-demographic total census audience parameter value (e.g., a $c_1$ value) and/or a cross-demographic total census impression parameter value (e.g., a $c_2$ value). The example value generator circuitry 306 determines a range (e.g., a lower bound constraint and an upper bound constraint) for the cross-demographic total census audience parameter value and the cross-demographic total census impressions parameter value. The value generator circuitry 306 determines the constraints for the cross-demographic total census audience parameter value and/or the cross-demographic total census impression parameter for estimating census-level impression counts per demographic category (e.g., the census-level impression counts data 136) and estimating total unique-audience sizes per demographic category (e.g., the census-level audience sizes data 138) according to example Equation 1 below.

$$0 \le c_1 \le \infty \qquad \text{(Equation 1)}$$

$$0 \le c_2 \le \min\left(\frac{R_k}{R_k - A_k}\right)$$

Example Equation 1 above specifies that the cross-demographic total census audience parameter value ($c_1$) and the cross-demographic total census impression parameter value ($c_2$) must be positive and be less than the upper bounds defined. In example Equation 1 above, a lower bound constraint is zero for both the cross-demographic total census audience parameter value ($c_1$) and the cross-demographic total census impression parameter value ($c_2$). In example Equation 1 above, an upper bound constraint for the cross-demographic total census audience parameter value ($c_1$) is chosen to be infinite. In example Equation 1 above, an upper bound constraint for the cross-demographic total census impression parameter value ($c_2$) is chosen to be the minimum of the database proprietor impression counts data ($R_k$) divided by the difference between $R_k$ and the database proprietor audience size data ($A_k$) (e.g.

$$\frac{R_k}{R_k - A_k}\Big)$$

across all demographics. In example Equation 1, the cross-demographic total census audience parameter value ($c_1$) and the cross-demographic total census impression parameter value ($c_2$) can be any rational number in the range from zero to the upper-bound.

Alternatively, the cross-demographic total census impression parameter values ($c_2$) can be calculated using a peak impression frequency value (f*) in example Equation 2 below. Impression frequency (f*) is determined by dividing the database proprietor subscriber impression counts data 132 ($R_k$) by the database proprietor subscriber audience sizes data 134 ($A_k$) (e.g.

$$\frac{R_k}{A_k}\Big)$$

$$0 \le c_2 \le \left(\frac{f^*}{f^* - 1}\right) \qquad \text{(Equation 2)}$$

In example Equation 2 above, the peak impression frequency value (f*) is the highest impression frequency across all demographic categories and, thus, results in the highest values for cross-demographic total census impression parameter values ($c_2$). In some examples, the example value generator circuitry 306 generates a cross-demographic total census impression parameter value ($c_2$) for each demographic category because each demographic category has its own impression count and unique audience size.

The audience metrics generator circuitry 112 includes example value tester circuitry 310 to select a cross-demographic total audience census parameter value ($c_1$) and/or a cross-demographic total impression census parameter value ($c_2$) in the allowable ranges defined by example Equations 1 and/or 2 above. The example value tester circuitry 310 selects the cross-demographic total audience census parameter value ($c_1$) and the cross-demographic total impression census parameter value ($c_2$) based on the constraint calculator circuitry 304 and the allowable ranges defined by example Equations 1 and/or 2 above. If the example constraint calculator circuitry 304 determines the census-level total impressions counts and the census-level total audience size are unknown, the example value tester circuitry 310 sets the cross-demographic total audience census parameter value ($c_1$) and the cross-demographic total impression census parameter value ($c_2$) to 1. For example, the audience sizes for each demographic ($X_k$) are equal to the database proprietor subscriber audience sizes data 134 for the $k^{th}$ demographic category ($A_k$), and the impression counts for each demographic ($T_k$) are equal to the database proprietor subscriber impression counts data 132 for the $k^{th}$ demographic category ($R_k$). If the example constraint calculator circuitry 304 determines the census-level total impressions count is unknown and the census-level total audience size is known, the example value tester circuitry 310 sets the cross-demographic total impression census parameter value ($c_2$) to 1, and the value tester circuitry 310 selects a cross-demographic total audience census parameter value ($c_1$) in the allowable range of example Equation 1 above. If the example constraint calculator circuitry 304 determines the census-level total impressions count is known and the census-level total audience size is unknown, the value tester circuitry 310 sets the cross-demographic total audience census parameter value ($c_1$) to 1, and the example value tester circuitry 310 selects a cross-demographic total impression census parameter value ($c_2$) in the allowable range of example Equations 1 and/or 2 above. If the example constraint calculator circuitry 304 determines the census-level total impressions counts and the census-level total audience size are known, the example value tester circuitry 310 selects a cross-demographic total audience census parameter value ($c_1$) and a cross-demographic total impression census parameter value ($c_2$) in the allowable range of example Equations 1 and/or 2 above.

The audience metrics generator circuitry 112 is provided with example census audience size calculator circuitry 312 to determine the example census-level audience sizes data 138 based on the database proprietor subscriber impression counts data 132, the database proprietor subscriber audience sizes data 134, the cross-demographic total census audience parameter value ($c_1$), and the cross-demographic total census impression parameter value ($c_2$) using, for example, Equation 3 below.

$$X_k = r_k U_k \qquad \text{(Equation 3)}$$

In example Equation 3 above, the example census-level audience sizes data 138 ($X_k$) is determined based on the proportion of the audience universe estimate for the $k^{th}$ demographic category ($r_k$) and the universe estimate for the $k^{th}$ demographic category ($U_k$). In some examples, the proportion of the audience universe estimate ($r_k$) can be solved using Equation 22 below, which includes the database proprietor subscriber audience sizes data 134 for the $k^{th}$ demographic category ($A_k$), the database proprietor sub- scriber impression counts data 132 for the $k^{th}$ demographic category ($R_k$), the universe estimate for the $k^{th}$ demographic category ($U_k$), and the cross-demographic total census audience parameter value ($c_1$) selected for this iteration. After the census-level audience sizes data 138 ($X_k$) is determined, example census impression count calculator circuitry 314 accesses the selected cross-demographic total audience census parameter value ($c_1$), the selected cross-demographic total census impression parameter value ($c_2$), and the census-level audience sizes data 138 ($X_k$) as inputs.

The audience metrics generator circuitry 112 is provided with the example census impression count calculator circuitry 314 to determine the census-level impression counts data 136 based on the database proprietor subscriber impression counts data 132, the database proprietor subscriber audience sizes data 134, the cross-demographic total census audience parameter value ($c_1$), the cross-demographic total census parameter value ($c_2$), and the census-level audience sizes data 138 ($X_k$) using, for example, Equation 4 below.

$$T_k = f_k X_k \qquad \text{(Equation 4)}$$

In example Equation 4 above, the census-level impression counts data 136 ($T_k$) is determined based on the estimated frequency of impressions on the census for the $k^{th}$ demographic category ($f_k$) and the census-level audience sizes data 138 ($X_k$). In some examples, the estimated frequency of impressions on the census for the $k^{th}$ demographic category ($f_k$) can be solved using Equation 22 below, which includes the database proprietor subscriber audience sizes data 134 for the $k^{th}$ demographic category ($A_k$), the database proprietor subscriber impression counts data 132 for the $k^{th}$ demographic category ($R_k$), the universe estimate for the $k^{th}$ demographic category ($U_k$), and the cross-demographic total census audience parameter value ($c_1$) selected for this iteration, and the cross-demographic total census impression parameter value ($c_2$) selected for this iteration.

The audience metrics generator circuitry 112 is provided with example verification controller circuitry 308 to verify that the estimated census-level audience size data 138 is logically consistent with the census-level total audience size collected by the AME 102. In some examples, the verification controller circuitry 308 verifies that the estimated census-level audience size data 138 is logically consistent with the census-level total audience size when the constraint calculator circuitry 304 determines the census-level total audience size is known (e.g., collected by the AME 102). The example verification controller circuitry 308 uses example Equation 5 as shown below.

$$\sum_{k=1}^{K} X_k = X. \qquad \text{(Equation 5)}$$

Example Equation 5 above is a X-constraint. In example Equation 5 above, the census-level total audience size (X.) is known based on the census audiences collected by the AME 102. As expressed in example Equation 5 above, the example verification controller circuitry 308 confirms the validity of the individual census-level audience sizes ($\Sigma X_k$) for the k demographic categories by determining whether the sum of all the individual census-level audience sizes ($\Sigma X_k$) from the first demographic category (k=1) to the last demographic category (K) is equal to the census-level total audience size (X.). The example verification controller circuitry 308 either returns an affirmative response or a negative response. If the example verification controller circuitry 308 determines that the sum of the individual census-level audience sizes ($\Sigma X_k$) for the k demographic categories is equal to the census-level total audience size (X.), the verification controller circuitry 308 generates a response or information to inform the value tester circuitry 310 that the previously selected cross-demographic total census audience parameter value ($c_1$) and/or the previously selected cross-demographic total census impression parameter value ($c_2$) satisfies the constraint of Equation 5 above. Since the previously selected cross-demographic total census audience parameter value ($c_1$) and/or the previously selected cross-demographic total census impression parameter value ($c_2$) satisfies the constraint of Equation 5 above, the example value tester circuitry 310 then does not select a different cross-demographic total census audience parameter value ($c_1$) or a different cross-demographic total census impression parameter value ($c_2$) for testing. Instead, the verification controller circuitry 308 verifies that the estimated census-level impression counts data 136 is logically consistent with the census-level total impression count collected by the AME 102 if the census-level total impressions count is known. If the AME 102 did not collect census-level total impression count, then the example value tester circuitry 310 instructs the data interface 302 to store the census-level audience sizes data 138 and the census-level impression counts data 136 in memory. In addition, the audience metrics generator circuitry 112 is provided with an example communications interface 316 to send the census-level audience sizes data 138 and the census-level impression counts data 136 for each demographic category to an example audience metrics customer 330.

If the example verification controller circuitry 308 determines that the sum of the individual census-level audience sizes ($\Sigma X_k$) for the k demographic categories is not equal to the census-level total impression count (X.), the verification controller circuitry 308 generates a response or information to inform the value tester circuitry 310 that the previously selected cross-demographic total census audience parameter value ($c_1$) and/or the previously selected cross-demographic total census impression parameter value ($c_2$) does not satisfy the constraint of Equation 5 above. The example value tester circuitry 310 selects a different cross-demographic total census audience parameter value (ci) and/or a different cross-demographic total census impression parameter value ($c_2$) to test. This iteration of testing the different cross-demographic total census audience parameter values ($c_1$) and/or cross-demographic total census impression parameter values ($c_2$) may occur in some examples throughout the entire range of allowable cross-demographic total census audience parameter values ($c_1$) and the entire range of allowable cross-demographic total census impression parameter values ($c_2$). Eventually, a cross-demographic total census audience parameter value ($c_1$) and/or a cross-demographic total census impression parameter value ($c_2$) will result in satisfying the constraint of Equation 5 above.

The example verification controller circuitry 308 verifies that the estimated census-level impression counts data 136 is logically consistent with the census-level total impression count collected by the AME 102. In some examples, the verification controller circuitry 308 verifies that the estimated census-level impression counts data 136 is logically consistent with the census-level total impression count when the constraint calculator circuitry 304 determines the census-level total impression count is known (e.g., collected by the AME 102). The example verification controller circuitry 308 uses Equation 6 as shown below.

$$\sum_{k=1}^{K} T_k = T. \qquad \text{(Equation 6)}$$

Equation 6 above is a T-constraint. In example Equation 6 above, the census-level total impression count (T.) is known based on the census impressions collected by the AME 102. As expressed in Equation 6 above, the example verification controller circuitry 308 confirms the validity of the individual census-level impression counts ($\Sigma T_k$) for the k demographic categories by determining whether the sum of all the individual census-level impression counts ($\Sigma T_k$) from the first demographic category (k=1) to the last demographic category (K) is equal to the census-level total impression count (T.). The example verification controller circuitry 308 either returns an affirmative response or a negative response. If the example verification controller circuitry 308 determines that the sum of the individual census-level impression counts ($\Sigma T_k$) for the k demographic categories is equal to the census-level total impression count (T.), the verification controller circuitry 308 generates a response or information to inform the value tester circuitry 310 that the previously selected cross-demographic total census audience parameter value ($c_1$) and/or the previously selected cross-demographic total census impression parameter value ($c_2$) satisfies the constraint of example Equation 6 above. Since the previously selected cross-demographic total census audience parameter value ($c_1$) and the previously selected cross-demographic total census impression parameter value ($c_2$) satisfies the constraint of example Equation 6 above, the example value tester circuitry 310 then does not select a different cross-demographic total census audience parameter value ($c_1$) or a different cross-demographic total census impression parameter value ($c_2$) for testing. Instead, the value tester circuitry 310 instructs the data interface 302 to store the census-level audience sizes data 138 and the census-level impression counts data 136 in memory. In addition, the audience metrics generator circuitry 112 is provided with an example communications interface 316 to send the census-level audience sizes data 138 and the census-level impression counts data 136 for each demographic category to an example audience metrics customer 330.

If the example verification controller circuitry 308 determines that the sum of the individual census-level impression counts ($\Sigma T_k$) for the k demographic categories is not equal to the census-level total impression count (T.), the example verification controller circuitry 308 generates a response or information to inform the value tester circuitry 310 that the previously selected cross-demographic total census audience parameter value ($c_1$) and/or the previously selected cross-demographic total census impression parameter value ($c_2$) does not satisfy the constraint of Equation 6 above. The example value tester circuitry 310 selects a different cross-demographic total census audience parameter value ($c_1$) and/or a different cross-demographic total census impression parameter value ($c_2$) to test. This iteration of testing the different cross-demographic total census audience parameter values ($c_1$) and/or cross-demographic total census impression parameter values ($c_2$) may occur in some examples throughout the entire range of allowable cross-demographic total census audience parameter values ($c_1$) and the entire range of allowable cross-demographic total census impression parameter values ($c_2$). Eventually, a cross-demographic total census audience parameter value ($c_1$) and/or a cross-demographic total census impression parameter value ($c_2$) will result in satisfying the constraint of Equation 5 and Equation 6 above.

While an example manner of implementing the audience metrics generator circuitry 112 of FIGS. 1 and 2 is illustrated in FIG. 3, one or more of the elements, processes and/or devices illustrated in FIG. 3 may be combined, divided, re-arranged, omitted, eliminated and/or implemented in any other way. Further, the example data interface 302, the example constraint calculator circuitry 304, the example value generator circuitry 306, the example verification controller circuitry 308, the example value tester circuitry 310, the example census audience size calculator circuitry 312, the example census impression count calculator circuitry 314, the example communications interface 316 and/or, more generally, the example audience metrics generator circuitry 112 of FIG. 3 may be implemented by hardware, software, firmware and/or any combination of hardware, software and/or firmware. Thus, for example, any of the example data interface 302, the example constraint calculator circuitry 304, the example value generator circuitry 306, the example verification controller circuitry 308, the example value tester circuitry 310, the example census audience size calculator circuitry 312, the example census impression count calculator circuitry 314, the example communications interface 316 and/or, more generally, the example audience metrics generator circuitry 112 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example data interface 302, the example constraint calculator circuitry 304, the example value generator circuitry 306, the example verification controller circuitry 308, the example value tester circuitry 310, the example census audience size calculator circuitry 312, the example census impression count calculator circuitry 314, and/or the example communications interface 316 is/are hereby expressly defined to include a non-transitory computer readable storage device or storage disk such as a memory, a digital versatile disk (DVD), a compact disk (CD), a Blu-ray disk, etc. including the software and/or firmware. Further still, the example audience metrics generator circuitry 112 of FIG. 3 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

A flowchart representative of example hardware logic, machine readable instructions, hardware implemented state machines, and/or any combination thereof for implementing the audience metrics generator circuitry 112 of FIGS. 1-3 is shown in FIGS. 4, 5, 6, and 7. The machine readable instructions may be one or more executable programs or portion(s) of an executable program for execution by a computer processor and/or processor circuitry, such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowchart illustrated in FIGS. 4, 5, 6, and 7, many other methods of implementing the example audience metrics generator circuitry 112 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 4, 5, 6, and 7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 4:
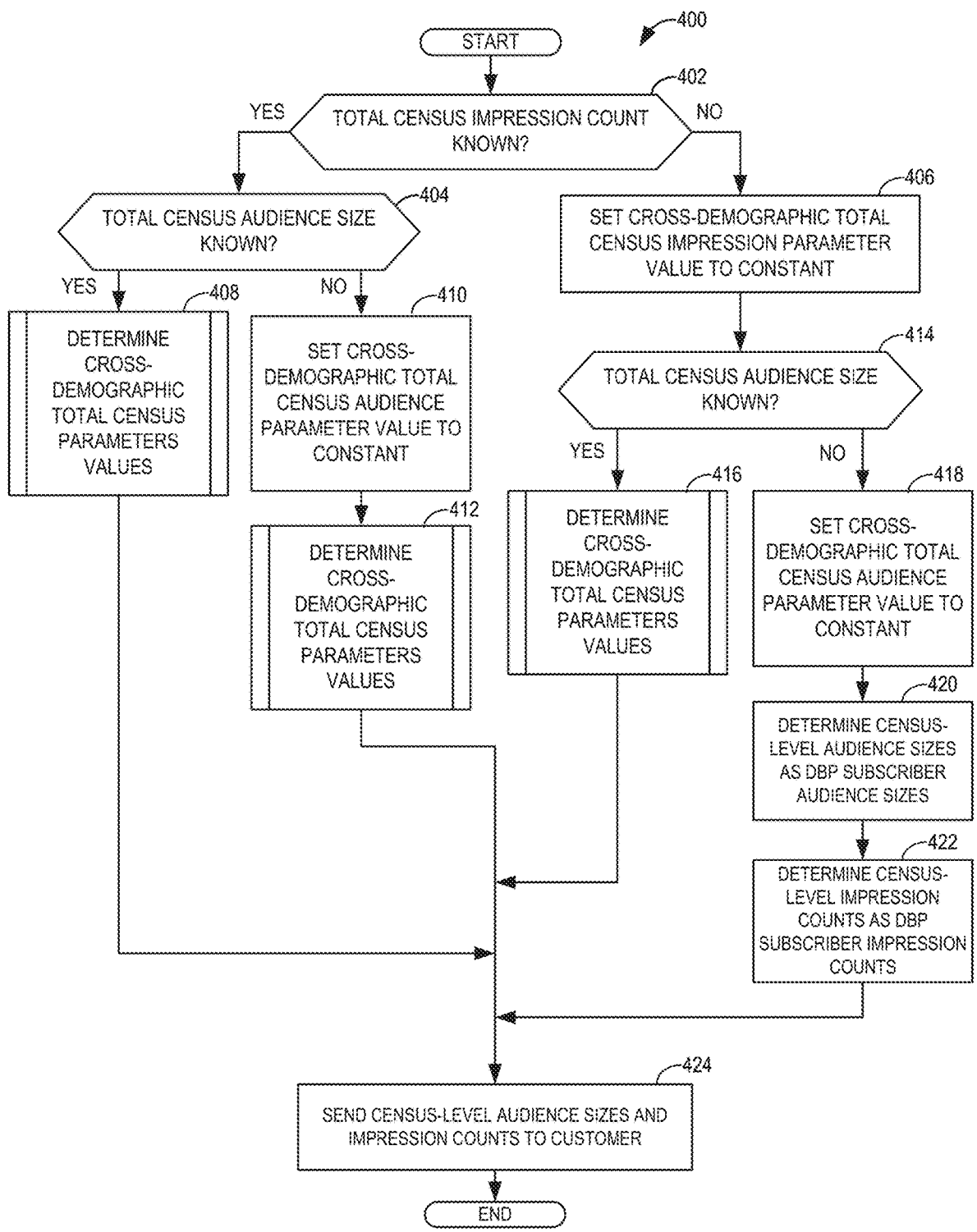
FIG. 4 is a flowchart representative of example machine-readable instructions which may be executed to implement the example audience metrics generator circuitry of FIGS. 1-3 to estimate census-level impression count data and census-level unique audience size data across multiple demographics from subscriber impression count data and subscriber unique audience size data for the multiple demographics when a total impression count is known and a total audience size is known in accordance with teachings of this disclosure.

FIG. 4 is a flowchart representative of example machine-readable instructions 400 which may be executed to implement the example audience metrics generator circuitry 112 of FIGS. 1-3 to estimate the census-level impression counts data 136 and the census-level unique audience sizes data 138 across multiple demographics based on the database proprietor subscriber impression counts data 132 and the database proprietor subscriber unique audience sizes data 134 for the multiple demographics. The example instructions 400 of FIG. 4 begin at block 402 at which the constraint calculator circuitry 304 (FIG. 3) determines if the total census impression count is known. If the example constraint calculator circuitry 304 determines the total census impression count is known, the instructions 400 continue to block 404 at which the constraint calculator circuitry 304 determines if the total census audience size is known. However, if at block 402 the example constraint calculator circuitry 304 determines the total census impressions count is not known, the instructions 400 continue to block 406 at which the example value generator circuitry 306 sets the cross-demographic total census impression parameter value to a constant value.

If at block 404 the example constraint calculator circuitry 304 determines the total census audience size is known, the instructions 400 continue to block 408 at which the example value generator circuitry 306 (FIG. 3) determines the cross-demographic total census parameters values. However, if at block 404 the example constraint calculator circuitry 304 determines the total census audience size is not known, the instructions 400 continue to block 410 at which the value generator circuitry 306 sets the cross-demographic total census audience parameter value to a constant value.

Figure 5:
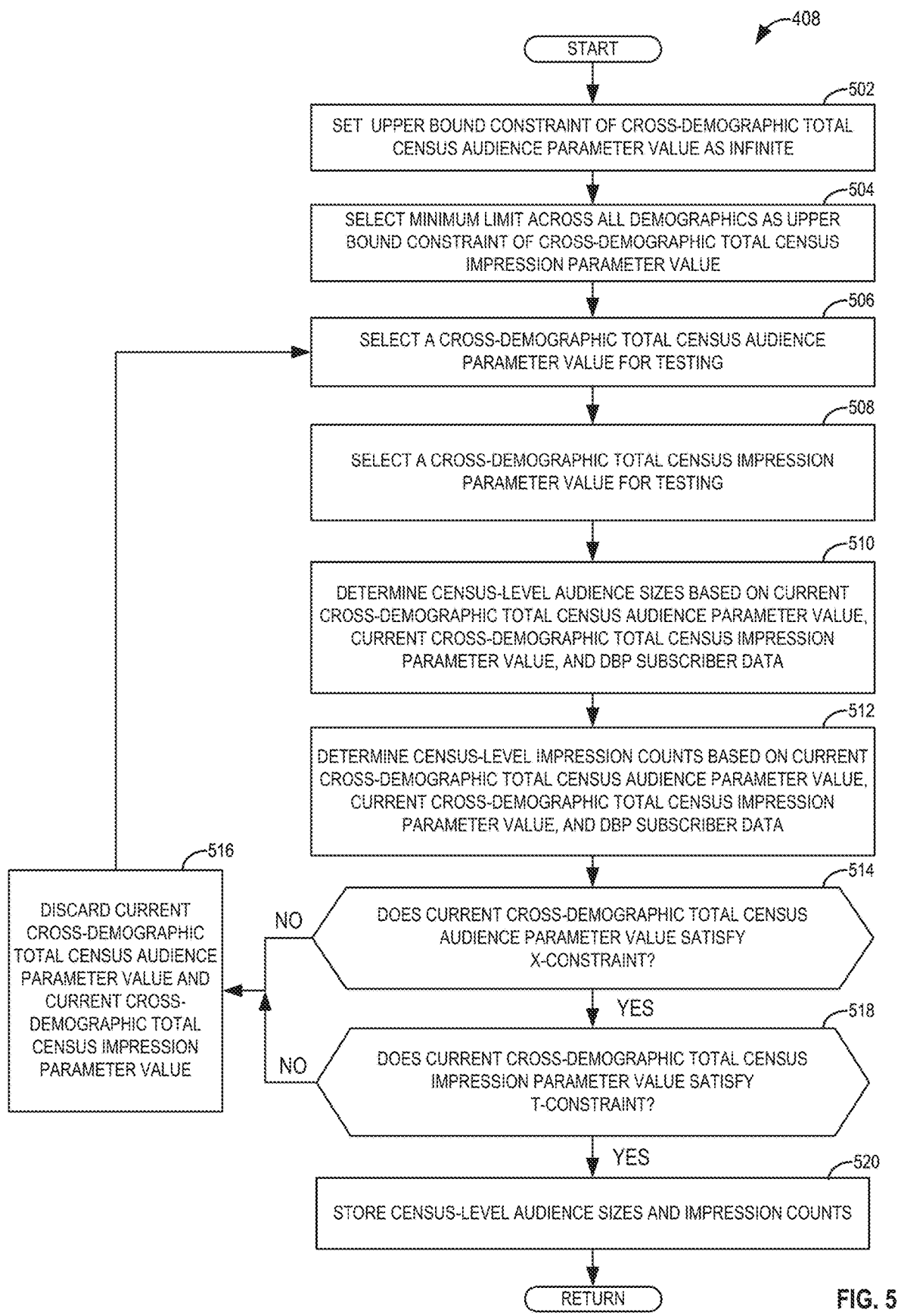
FIG. 5 is a flowchart representative of example machine-readable instructions which may be executed to implement the example audience metrics generator circuitry of FIGS. 1-3 to estimate census-level impression count data and census-level unique audience size data across multiple demographics from subscriber impression count data and subscriber unique audience size data for the multiple demographics when a total impression count is known and a total audience size is unknown in accordance with teachings of this disclosure.

At block 408, the example value generator circuitry 306 determines cross-demographic total census parameters values. As described in further detail below, the example flowchart of FIG. 5 represents example instructions that may be executed to implement block 408 to determine cross-demographic total census parameters values. After the example value generator circuitry 306 determines the cross-demographic total census parameters values, the instructions 400 continue to block 424 at which the example communications interface 316 (FIG. 3) sends the census-level audience sizes and impression counts to the customer.

Figure 6:
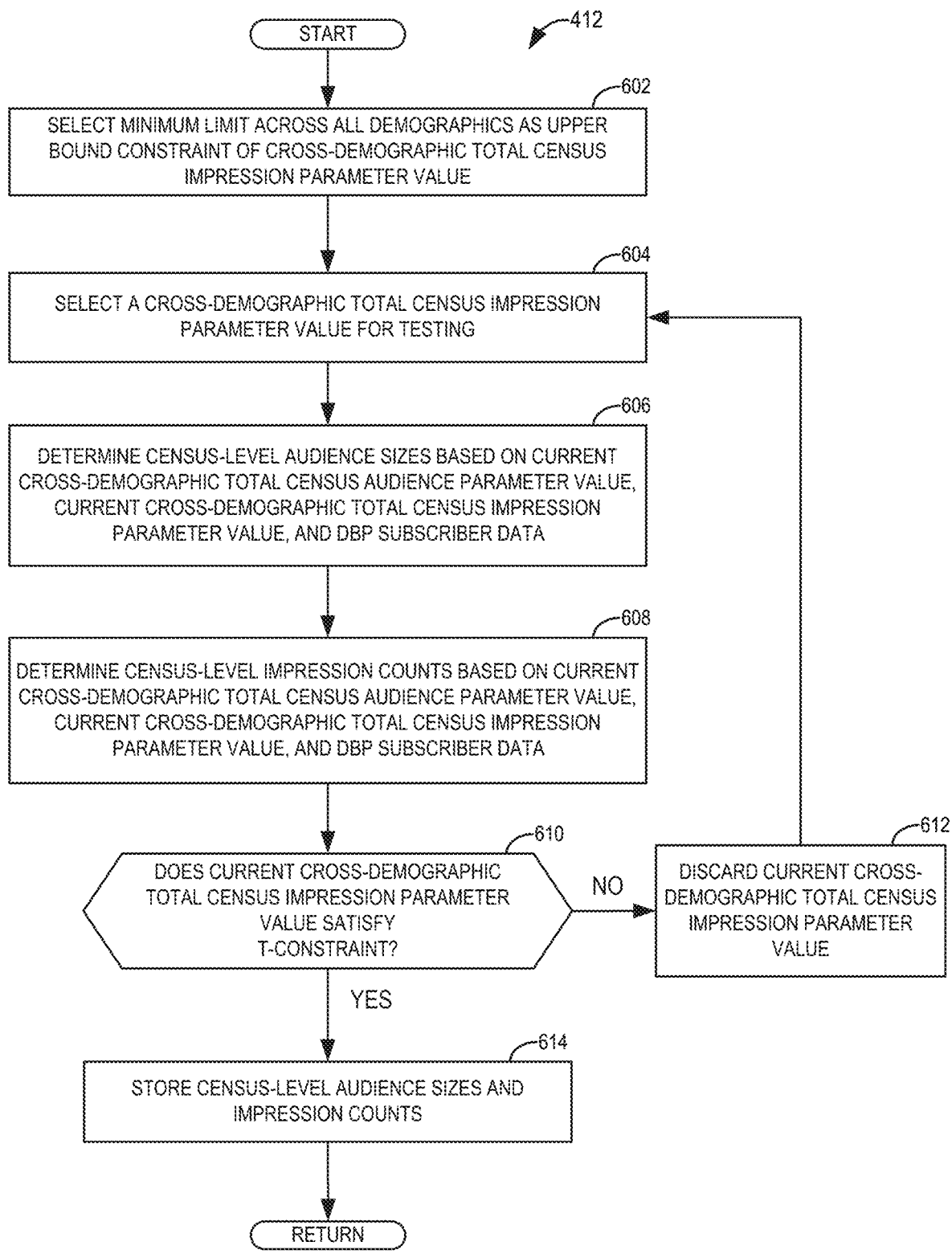
FIG. 6 is a flowchart representative of example machine-readable instructions which may be executed to implement the example audience metrics generator circuitry of FIGS. 1-3 to estimate census-level impression count data and census-level unique audience size data across multiple demographics from subscriber impression count data and subscriber unique audience size data for the multiple demographics when a total impression count is unknown and a total audience size is known in accordance with teachings of this disclosure.

At block 410, the example value generator circuitry 306 sets the cross-demographic total census audience parameter value to a constant. At block 412, the example value generator circuitry 306 determines the cross-demographic total census parameter values. As described in further detail below, the example flowchart of FIG. 6 represents example instructions that may be executed to implement block 412 to determine cross-demographic total census parameter values. After the example value generator circuitry 306 determines the cross-demographic total census parameters values, the instructions 400 continue to block 424 at which the example communications interface 316 sends the census-level audience sizes and impression counts to the customer.

At block 414, the constraint calculator circuitry 304 determines if the total census audience size is known. If at block 414 the example constraint calculator circuitry 304 determines the total census audience size is known, the instructions 400 continue to block 416 at which example value generator circuitry 306 determines the cross-demographic total census parameters values. However, if at block 414 the example constraint calculator circuitry 304 determines the total census audience size is not known, the instructions 400 continue to block 418 at which the example value generator circuitry 306 sets the cross-demographic total census audience parameter value to a constant value.

Figure 7:
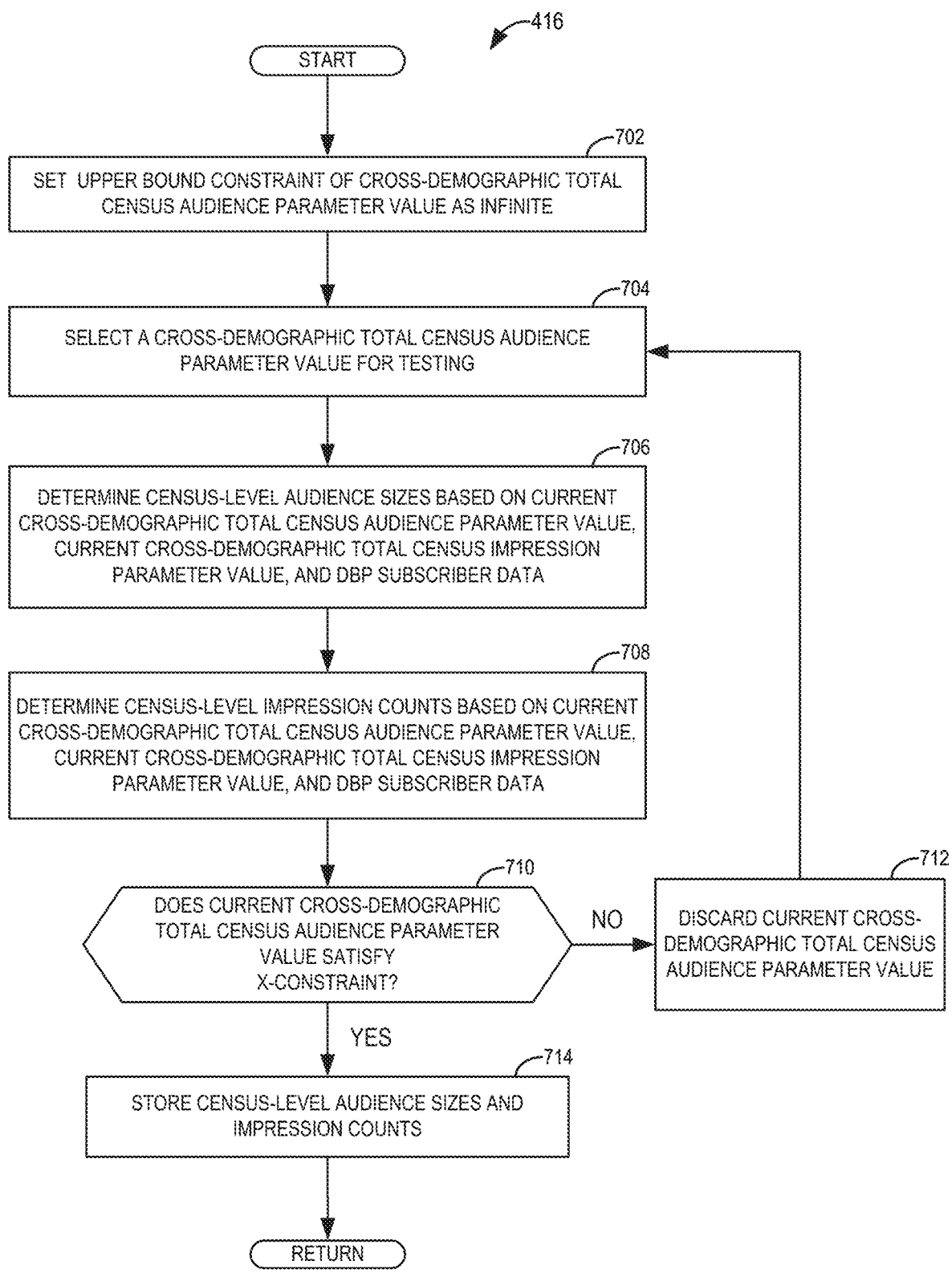
FIG. 7 is another flowchart representative of example machine-readable instructions which may be executed to implement the example audience metrics generator circuitry of FIGS. 1-3 to estimate census-level impression count data and census-level unique audience size data across multiple demographics from subscriber impression count data and subscriber unique audience size data for the multiple demographics a total impression count is unknown and when a total audience size is known in accordance with teachings of this disclosure.

At block 416, the example value generator circuitry 306 determines the cross-demographic total census parameters values. As described in further detail below, the example flowchart of FIG. 7 represents example instructions that may be executed to implement block 416 to determine cross-demographic total census parameter values. After the example value generator circuitry 306 determines the cross-demographic total census parameters values, the instructions 400 continue to block 424 at which the example communications interface 316 sends the census-level audience sizes and impression counts to the customer.

At block 418, the example value generator circuitry 306 sets the cross-demographic total census audience parameter value to a constant value. At block 420, the example audience size calculator circuitry 312 (FIG. 3) determines the census-level audience sizes as database proprietor subscriber audience sizes. At block 422, the impression count calculator circuitry 314 determines the census-level impressions counts as database proprietor subscriber impression counts. After the example impression count calculator circuitry 314 determines the census-level impression counts as database proprietor subscriber impression counts, the instructions 400 continue to block 424 at which the communications interface 316 sends the census-level audience sizes and impression counts to the customer.

At block 424, the example communications interface 316 sends the census level audience sizes and impression counts to the customer. After the example communications interface 316 sends the census level audience sizes and impression counts to the customer, the instructions 400 end.

FIG. 5 is a flowchart representative of example machine-readable instructions 408 which may be executed to implement the example audience metrics generator circuitry 112 of FIGS. 1-3 to estimate census-level impression count data and census-level unique audience size data across multiple demographics from subscriber impression count data and subscriber unique audience size data for the multiple demographics when a total impression count is known and when a total audience size is unknown. The examples instructions 408 may be executed to implement block 408 of FIG. 4. The example program 408 of FIG. 5 begins at block 502 at which the value generator circuitry 306 sets the upper bound constraint of the cross-demographic total census audience parameter value as infinite. At block 504, the example value generator circuitry 306 (FIG. 3) selects a minimum limit across all demographics as an upper bound constraint of the cross-demographic total census impression parameter value. In some examples, the example value generator circuitry 306 uses example Equation 1 above to determine the upper bound constraints for the cross-demographic total census audience parameter value and the cross-demographic total census impression parameter value.

At block 506, the example value tester circuitry 310 (FIG. 3) selects a cross-demographic total census audience parameter value for testing. At block 508, the example value tester circuitry 310 selects a cross-demographic total census impression parameter value for testing. At block 510, the example audience size calculator circuitry 312 (FIG. 3) determines the census-level audience sizes based on a current cross-demographic total census audience parameter value, a current cross-demographic total census impression parameter value, and the database proprietor subscriber data. In examples disclosed herein, the database proprietor subscriber data includes subscriber-level audience metrics information such as, impression counts and unique audience sizes per demographic category (e.g., females 13-18, males 13-18, females 19-23, males 19-23, etc.). At block 512, the example impression count calculator circuitry 314 (FIG. 3) determines the census-level impression counts based on the current cross-demographic total census audience parameter value, the current cross-demographic total census impression parameter value, and the database proprietor subscriber data.

At block 514, the example verification controller circuitry 308 (FIG. 3) determines if the current cross-demographic total census audience parameter value satisfies the X-constraint. If the example verification controller circuitry 308 determines the current cross-demographic total census audience parameter value does not satisfy the X-constraint, the instructions 408 continue to block 516 at which the example verification controller circuitry 308 discards the current cross-demographic total census audience parameter value and the current cross-demographic total census impression parameter value. However, if at block 514 the example verification controller circuitry 308 determines the current cross-demographic total census audience parameter value satisfies the X-constraint, the instructions 408 continue to block 518 at which the example verification controller circuitry 308 determines if the current cross-demographic total census impression parameter value satisfies the T-constraint.

If at block 518 the example verification controller circuitry 308 determines the current cross-demographic total census impression parameter value does not satisfy the T-constraint, the instructions 408 continue to block 516 at which the verification controller circuitry 308 discards the current cross-demographic total census audience parameter value and the current cross-demographic total census impression parameter value. However, if at block 518 the example verification controller circuitry 308 determines the current cross-demographic total census impression parameter value satisfies the T-constraint, the instructions 408 continue to block 520 at which the data interface 302 stores the census-level audience sizes and impression counts.

At block 516, the example verification controller circuitry 308 discards the current cross-demographic total census audience parameter value and the current cross-demographic total census impression parameter value. After the example verification controller circuitry 308 discards the current cross-demographic total census audience parameter value and the current cross-demographic total census impression parameter value, the instructions 408 return to block 506 at which the example value tester circuitry 310 selects another cross-demographic total census audience parameter value for testing.

At block 520, the example data interface 302 (FIG. 3) stores the census-level audience sizes and impression counts in memory. After the example data interface 302 stores the census-level audience sizes and impression counts, the instructions 408 end and control returns to the instructions 400 of FIG. 4.

FIG. 6 is a flowchart representative of example machine-readable instructions 412 which may be executed to implement the example audience metrics generator circuitry 112 of FIGS. 1-3 to estimate census-level impression count data and census-level unique audience size data across multiple demographics from subscriber impression count data and subscriber unique audience size data for the multiple demographics when a total impression count is unknown and when a total audience size is known. The example instructions 412 may be executed to implement block 412 of FIG. 4. The example program 412 of FIG. 6 begins at block 602 at which the example value generator circuitry 306 (FIG. 3)

selects a minimum limit across all demographics as an upper bound constraint of a cross-demographic total census impression parameter value.

At block 604, the example value tester circuitry 310 (FIG. 3) selects a cross-demographic total census impression parameter value for testing. At block 606, the example audience size calculator circuitry 312 (FIG. 3) determines the census-level audience sizes based on the current cross-demographic total census audience parameter value, the current cross-demographic total census impression parameter value, and the database proprietor subscriber data. At block 608, the example impression count calculator circuitry 314 (FIG. 3) determines the census-level impression counts based on the current cross-demographic total census audience parameter value, the current cross-demographic total census impression parameter value, and the database proprietor subscriber data.

At block 610, the example verification controller circuitry 308 (FIG. 3) determines if the current cross-demographic total census impression parameter value satisfies the T-constraint. If the example verification controller circuitry 308 determines the current cross-demographic total census impression parameter value does not satisfy the T-constraint, the instructions 412 continue to block 612 at which the example verification controller circuitry 308 discards the current cross-demographic total census impression parameter value.

However, if at block 610 the example verification controller circuitry 308 determines the current cross-demographic total census impression parameter value satisfies the T-constraint, the instructions 412 continue to block 614 at which the data interface 302 (FIG. 3) stores the census-level audience sizes and impression counts.

At block 612, the example verification controller circuitry 308 discards the current cross-demographic total census impression parameter value. After the example verification controller circuitry 308 discards the current cross-demographic total census impression parameter value, the instructions 412 return to block 604 at which the value tester circuitry 310 selects another cross-demographic total census impression parameter value for testing.

At block 614, the example data interface 302 (FIG. 3) stores the census-level audience sizes and impression counts in memory. After the example data interface 302 stores the census-level audience sizes and impression counts, the instructions 412 end and control returns to the instructions 400 of FIG. 4.

FIG. 7 is a flowchart representative of example machine-readable instructions which may be executed to implement the example audience metrics generator circuitry 112 of FIGS. 1-3 to estimate census-level impression count data and census-level unique audience size data across multiple demographics from subscriber impression count data and subscriber unique audience size data for the multiple demographics when a total impression count is unknown and when a total audience size is known. The example instructions 416 may be executed to implement block 416 of FIG. 4. The example program 416 of FIG. 7 begins at block 702 at which the value generator circuitry 306 (FIG. 3) sets the upper bound constraint of the cross-demographic total census audience parameter value as infinite.

At block 704, the example value tester circuitry 310 (FIG. 3) selects a cross-demographic total census audience parameter value for testing. At block 706, the example audience size calculator circuitry 312 (FIG. 3) determines the census-level audience sizes based on the current cross-demographic total census audience parameter value, the current cross-demographic total census impression parameter value, and the database proprietor subscriber data. At block 708, the example impression count calculator circuitry 314 determines the census-level impression counts based on the current cross-demographic total census audience parameter value, the current cross-demographic total census impression parameter value, and the database proprietor subscriber data.

At block 710, the example verification controller circuitry 308 (FIG. 3) determines if the current cross-demographic total census audience parameter value satisfies the X-constraint. If the example verification controller circuitry 308 determines the current cross-demographic total census audience parameter value does not satisfy the X-constraint, the instructions 416 continue to block 712 at which the example verification controller circuitry 308 discards the current cross-demographic total census audience parameter value.

However, if at block 710 the example verification controller circuitry 308 determines the current cross-demographic total census audience parameter value satisfies the X-constraint, the instructions 416 continue to block 714 at which the data interface 302 (FIG. 3) stores the census-level audience sizes and impression counts.

At block 712, the example verification controller circuitry 308 discards the current cross-demographic total census audience parameter value. After the example verification controller circuitry 308 discards the current cross-demographic total census audience parameter value, the instructions 416 return to block 704 at which the value tester circuitry 310 selects another cross-demographic total census audience parameter value for testing.

At block 714, the example data interface 302 (FIG. 3) stores the census-level audience sizes and impression counts in memory. After the example data interface 302 stores the census-level audience sizes and impression counts, the instructions 416 end and control returns to the instructions 400 of FIG. 4.

The following discussion is provided for the interested reader regarding the development of examples disclosed herein. However, examples disclosed herein are not limited to this manner of development, and use of examples disclosed herein is not dependent on any particular manner of development of such disclosed examples.

In collecting impression count and audience size data for use in examples disclosed herein, although each person of an audience in reality did have a fixed but unknown number of impressions, both in census and in the database proprietor database (e.g., 'John Smith' had 5 impressions of which only 2 were registered in database) the aggregate information obfuscates the person-specific data and a known aggregate among the individuals within a demographic is left. The uncertainty for each person is then expressed as a probability distribution. As an illustrative example assume the entire Universe consists of only five individuals. That uncertainty can be detailed with a collection of five probability distributions going across the possibility of each individual seeing zero, one, two, etc. impressions.

$p_0^{(1)} p_1^{(1)} p_2^{(1)} \ldots$ ←[Person 1]

$p_0^{(2)} p_1^{(2)} p_2^{(2)} \ldots$ $p_0^{(3)} p_1^{(3)} p_2^{(3)} \ldots$ $p_0^{(4)} p_1^{(4)} p_2^{(4)} \ldots$ $p_0^{(5)} p_1^{(5)} p_2^{(5)} \ldots$ ←[Person 5]

Where $p_j^{(i)}$ is the probability the $i^{th}$ person saw j impressions. For each person, the sum of probabilities they either saw no impression, one impression, two impression, etc. is one (e.g., $$\sum_{j=0}^{\infty} p_j^{(i)} = 1 \Big),$$

and all probabilities must be accounted for across the mutually exclusive and exhaustive combinations.

In the example below, a demographic label is added to each person to categorize the person into a demographic group.

$$\left.\begin{matrix} p_0^{(1)} & p_1^{(1)} & \cdots & p_n^{(1)} \\ p_0^{(2)} & p_1^{(2)} & \cdots & p_n^{(2)} \end{matrix}\right\} \text{Demo 1}$$

$$\left.\begin{matrix} p_0^{(3)} & p_1^{(3)} & \cdots & p_n^{(3)} \\ p_0^{(4)} & p_1^{(4)} & \cdots & p_n^{(4)} \\ p_0^{(5)} & p_1^{(5)} & \cdots & p_n^{(5)} \end{matrix}\right\} \text{Demo 2}$$

Without any knowledge of demographic information, either in audiences or impressions, adding a demographic label does not impact the probability distribution. Person 1 could be assigned the label 'Male', or a different label of 'New York'. Neither impacts the probability distribution itself. However, knowledge of demographic-specific information does impact the distribution.

Consider the case of the $i^{th}$ demographic consisting of $U^{(i)}$ individuals. If there is no knowledge of individual behavior, but known total behavior, every individual within that demographic must be assigned the same probability distribution. For example, there are 100 audience members and 300 total impressions, each person has an average of three impressions. The available information of the problem above includes both audience size and impression counts. In other words, an estimate of the distribution for any individual within the population subject to some value of $d_1$ (probability of being in the audience) and $d_2$ (average number of impressions) can be determined by solving the general problem of example Equation 7 below.

maximize $PH =$ $$-\sum_{i=1}^{\infty} p_i \log(p_i) \text{ subject to} \begin{bmatrix} 1 & 1 & 1 & 1 & \cdots \\ 0 & 1 & 1 & 1 & \cdots \\ 0 & 1 & 2 & 3 & 4 & \cdots \end{bmatrix} \begin{bmatrix} p_0 \\ p_1 \\ p_2 \\ \cdots \end{bmatrix} = \begin{bmatrix} 1 \\ d_1 \\ d_2 \end{bmatrix}$$

(Equation 7)

The solution in terms of z notation can be expressed as shown in example Equation 8 below.

$$p_i = \begin{cases} z_0, & i = 0 \\ z_0 z_1 z_2^i, & i > 0 \end{cases}$$

(Equation 8)

To solve for the set of (z,), three simultaneous equations are solved as shown in example Equation 9 below.

$$\sum_{i=0}^{\infty} p_i = z_0 + \sum_{i=1}^{\infty} z_0 z_1 z_2^i = z_0 + \frac{z_0 z_1 z_2}{1 - z_2} = 1$$

$$\sum_{i=1}^{\infty} p_i = \sum_{i=1}^{\infty} z_0 z_1 z_2^i = \frac{z_0 z_1 z_2}{1 - z_2} = d_1$$

$$\sum_{i=0}^{\infty} i p_i = \sum_{i=1}^{\infty} i z_0 z_1 z_2^i = \frac{z_0 z_1 z_2}{(1 - z_2)^2} = d_2$$

(Equation 9)

The solution of $(z_0, z_1, z_2)$ can be solved in closed form in example Equation 10 below.

$$z_0 = 1 - d_1$$

$$z_1 = \frac{d_1^2}{(1 - d_1)(d_2 - d_1)}$$

$$z_2 = 1 - \frac{d_1}{d_2}$$

(Equation 10)

For example, if among 100 individuals there is an audience size of 50 people and there is an impression count of 400 impressions, the results are shown in example Equation 11 below.

$$d_0 = \frac{100}{100} \quad z_0 = 1 - d_1 \quad = \frac{1}{2}$$

$$d_1 = \frac{50}{100} \rightarrow z_0 = \frac{d_1^2}{(1 - d_1)(d_2 - d_1)} = \frac{1}{7}$$

$$d_2 = \frac{400}{100} \quad z_0 = 1 - \frac{d_1}{d_2} \quad = \frac{7}{8}$$

(Equation 11)

To satisfy the value of $d_0 = 1$ by the normalization constraint, all 100 people must be accounted for. In addition, since the behavior is evenly divided across the individuals, the total probability across any behavior for each individual is 1. An estimate of any probability can be calculated for each individual (e.g., $$p_2 = z_0 z_1 z_2^2 = \frac{7}{128} \approx 0.05463$$

As that is for each individual, and there are 100 individuals in this population, the computation would estimate that an expected value of 5.4 individuals had two impressions.

A representation of example Table 1 above is shown in example Table 2 below.

TABLE 2

| Demo | Population | Database Proprietor | | Census | |
| --- | --- | --- | --- | --- | --- |
| | | Audience | Impressions | Audience | Impressions |
| 1 | $U_1$ | $A_1$ | $R_1$ | $X_1$ | $T_1$ |
| 2 | $U_2$ | $A_2$ | $R_2$ | $X_2$ | $T_2$ |
| ... | ... | ... | ... | ... | ... |
| k | $U_k$ | $A_k$ | $R_k$ | $X_k$ | $T_k$ |
| Total | | | | | |

In the above example Table 2, $R_k$ is the recorded raw impression count from the third-party database proprietor for the $k^{th}$ demographic, $A_k$ is the recorded raw audience size from the third-party database proprietor for the $k^{th}$ demographic, $T_k$ is the census raw impression count for the $k^{th}$ demographic, $X_k$ is the census raw audience size for the $k^{th}$ demographic, and $U_k$ is the universe estimate for the $k^{th}$ demographic. As used herein, raw data refers to a count of the number of people from the normalized data used in calculations. For example, data normalization factor for a population of 1,000 (universe estimate) may be 30% if a random person has a 30% chance of being in an audience. In that example, the raw data is 300 people (e.g., the normalization factor multiplied by the universe estimate). The non-subscripted variables are the totals across the demographic groups. For example, the variable T. would be defined as $$T. = \sum_{k=1}^{K} T_k$$

and likewise for the other variables. For example, let a specific person in the $k^{th}$ demographic be of interest. If the third-party subscriber data (e.g., the third-party subscriber data 202 of FIG. 2) is defined as the prior distribution (Q), and Census is defined as the posterior distribution (P), by the above argument the audience sizes and impression counts are equally divided across those $U_k$ individuals. That is, the probability a specific individual in the $k^{th}$ demographic is a member of the third-party aggregated audience total is:

$$\frac{A_k}{U_k}.$$

In addition, the probability a specific individual in the $k^{th}$ demographic is a member of the third-party aggregated total impression count is:

$$\frac{X_k}{U_k}.$$

Example notations of such probabilities are shown in example Equation 12 below.

$$\begin{aligned} d_0^Q &= 1 & d_0^P &= 1 \\ d_1^Q &= \frac{A_k}{U_k} & d_1^P &= \frac{X_k}{U_k} \\ d_2^Q &= \frac{R_k}{U_k} & d_2^P &= \frac{T_k}{U_k} \end{aligned}$$ (Equation 12)

As both audience size and impression counts are on the same domain and have the same linear constraints, just different values, the Maximum Entropy solution can be used directly to determine the KL-divergence of that individual from third party to census, as shown below in example Equation 13.

$$KL(P_k:Q_k) = \sum_{j=0}^{m} d_j^P \log\left(\frac{z_j^P}{z_j^Q}\right)$$ (Equation 13)

In example Equation 13 above, superscript notations of z represent either P or Q. Example Equations 14 below represent the set $(z_j)$ with appropriate changes of known values.

$$z_0 = 1 - d_1$$ (Equation 14)

$$z_1 = \frac{d_1^2}{(1 - d_1)(d_2 - d_1)}$$

$$z_2 = 1 - \frac{d_1}{d_2}$$

With an expansion of the formula, writing log a/b=log(a)−log(b), the full expression is shown in example Equation 15 below.

$$\begin{aligned} KL(P_k:Q_k) &= \sum_{j=0}^{m} d_j^P \log\left(\frac{z_j^P}{z_j^Q}\right) \\ &= \sum_{j=0}^{m} d_j^P [\log z_j^P - \log z_j^Q] \\ &= (d_0^P)[\log(z_0^P) - \log(z_0^Q)] \ldots + \\ &\quad (d_1^P)[\log(z_1^P) - \log(z_1^Q)] \ldots + \\ &\quad (d_2^P)[\log(z_2^P) - \log(z_2^Q)] \ldots \end{aligned}$$ (Equation 15)

This describes the behavior how any specific individual's distribution within the $k^{th}$ demographic may change. However, for each demographic group there are $U_k$ individuals with the same behavior. Thus $KL(P_k:Q_k)$ is multiplied by $U_k$. This is the same as adding the KL-divergence of each individually together, but since the divergences are all the same, they can just be multiplied. After multiplying, it is determined how all individuals within a demographic group may change, but the total divergence across the population is not determined. The total divergence across the population can be determined by summing across all divergences and across all demographics.

$$KL(P:Q) = \sum_{k=1}^{K} U_k (KL(P_k:Q_k))$$ (Equation 16)

After all variables in example Table 2 above have been substituted, example Equation 16 describes the behavior of audience sizes and impression counts once minimized.

For this specific problem, census raw impression counts ($T_k$) and census raw audience sizes ($X_k$) are unknown, but subject to the aggregate constraints of $\Sigma X_k = X$. and/or $\Sigma T_k = T$.. As such, the following optimization in example Equation 17 is solved for:

(Equation 17)

minimize $\{T_k\}, \{X_k\} KL(P:Q) =$ $$\sum_{k=1}^{K} U_k(KL(P_k:Q_k)) \text{ subject to } \begin{aligned} \sum_{k=1}^{K} X_k &= X. \\ \sum_{k=1}^{K} T_k &= T. \end{aligned}$$

The system can be solved by taking the Lagrangian as shown in example Equation 18 below and solving for the case in which the 2k+1 system of equations are all zero as represented in example Equation 19 below.

$$\mathcal{L} = KL(P:Q) - \lambda_1\left(\sum_{k=1}^{K} X_k - X.\right) - \lambda_2\left(\sum_{k=1}^{K} T_k - T.\right) \quad \text{(Equation 18)}$$

$$\frac{\partial \mathcal{L}}{\partial T_k} \quad \forall k = \{1, 2, \ldots, K\} \quad \text{(Equation 19)}$$

$$\frac{\partial \mathcal{L}}{\partial X_k} \quad \forall k = \{1, 2, \ldots, K\}$$

$$\frac{\partial \mathcal{L}}{\partial \lambda_1}$$

$$\frac{\partial \mathcal{L}}{\partial \lambda_2}$$

Other than the constraint of total impressions across demographics, each demographic is mutually exclusive and does not impact the other demographics. As such, the derivative of $T_k$ or $X_k$ of $\mathcal{L}$ only involves terms of the same demographic as shown in example Equation 20 below, with the additional terms of $\lambda_1$ and $\lambda_2$ within the impression counts to account for the census total impression count constraint.

$$\frac{\partial \mathcal{L}}{\partial X_k} = \log\left(\frac{X_k^2}{(T_k - X_k)(U_k - X_k)}\right) - \log\left(\frac{A_k^2}{(R_k - A_k)(U_k - A_k)}\right) - \lambda_1 \quad \text{(Equation 20)}$$

$$\frac{\partial \mathcal{L}}{\partial T_k} = \log\left(1 - \frac{X_k}{T_k}\right) - \log\left(1 - \frac{A_k}{R_k}\right) - \lambda_2$$

Notice that both the census raw impression counts $T_k$ and the census raw audience sizes $X_k$ appear within each equation. As such, the equations must be solved simultaneously when equaled to zero. Substituting $c1=\exp(\lambda_1)$ and $c2=\exp(\lambda_2)$ is shown in example Equation 21 below.

$$s_k^{(1)} = \frac{A_k^2}{(R_k - A_k)(U_k - A_k)} \equiv z_1^Q \text{ (for demo } k) \quad \text{(Equation 21)}$$

$$s_k^{(2)} = 1 - \frac{A_k}{R_k} \equiv z_2^Q \text{ (for demo } k)$$

The solution for $X_k$ (e.g., raw audience size) and $T_k$ (e.g., raw impression count) for demographic k is shown in example Equation 22 below.

$$f_k = \left(1 - c_2 s_k^{(2)}\right)^{-1} \quad \text{(Equation 22)}$$

$$o_k = c_1 s_k^{(1)}(f_k - 1)$$

$$r_k = \frac{o_k}{1 - o_k}$$

$$X_k = r_k U_k$$

$$T_k = f_k X_k$$

In example Equation 22 above, $f_k$ is the estimated frequency of impressions on the census for the $k^{th}$ demographic, $o_k$ represents the odds of the $k^{th}$ demographic being in the audience, and $r_k$ represents the proportion of the Universe Estimate that $X_k$ represents. In example Equation 22 above, the expression for $r_k$ converts the odds of the $k^{th}$ demographic being in the audience (ok) to a proportion of the Universe Estimate of $X_k$. The estimates of $X_k$ (e.g., raw audience size) and $T_k$ (e.g., raw impression count) can be determined from $r_k$ and $f_k$. In the example Equation 22 above, $f_k$, $o_k$, and $r_k$ are normalized for the calculation. In the example Equation 22 above, the expression for $X_k$ converts the proportion of the Universe Estimate ($r_k$) to raw counts of the audience size by multiplying with the universe estimate for the $k^{th}$ demographic ($U_k$), and the expression for $T_k$ converts the estimated frequency of impressions ($f_k$) to raw counts of the impression count by multiplying with the raw audience size for the $k^{th}$ demographic ($X_k$).

The variables $\{c_1; c_2\}$ are modified until the constraints are satisfied. The necessary inequalities are represented in example Equation 1 above, where the minimization is across all demographics. This is due to that fact as $c_2$ increases the estimate of $\hat{X}_k$ also increases, and at some point, the maximum limit of the estimate of $\hat{X}_k$ is reached, which is represented as $U_k$. The upper limit for the value $c_2$ for any demographic is $$\frac{R_k}{R_k - A_k}.$$

In order to be logically consistent across all demographics, the value of $c_2$ must be below the minimum limit across all demographics. Equivalently, the highest frequency of impressions per audience among the panel demographics should be f*, which is represented in example Equation 2 above.

Notice that within the optimization of example Equation 18, if either $\lambda_1=0$ or $\lambda_2=0$, the terms which contribute to the corresponding constraint disappear. That expression is now unconstrained. The transformation of $c=\exp(\lambda)$ is equivalent to predefining either $c_1$ or $c_2$ to numerically equal one if the corresponding aggregate constraint is not specified. The remaining variable(s) will still need to be solved. In other words, all four combinations can be expressed as the following:

1. Both {X., T.} are unknown $c_1 \equiv 1$ $c_2 \equiv 1$

2. X. is known and given, T. is unknown $c_1$ to be solved to match X. constraint $c_2 \equiv 1$ 3. X. is unknown, T. is known and given $c_1 \equiv 1$ $c_2$ to be solved to match T. constraint 4. Both {X., T.} are known and given $c_1$ to be solved to match X. constraint $c_2$ to be solved to match T. constraint In case 1 above, there is nothing to evaluate or optimize. For all demographics, $X_k = A_k$ and $T_k = R_k$ and there is no change.

An example of the estimating demographic-based census-level impression counts and demographic-based census-level audience sizes for census data in accordance with examples disclosed herein is described below in connection with finite universe (population) data, third-party data, and total census impression count (T.) shown in example Table 3 below.

TABLE 3

| | | Third-Party | | Census | |
|---|---|---|---|---|---|
| Demo | Population | Audience | Impressions | Audience | Impressions |
| <18 | 55,000 | 3,113 | 4,140 | $X_1$ | $T_1$ |
| 18-34 | 477,000 | 14,323 | 23,000 | $X_2$ | $T_2$ |
| 35-44 | 312,000 | 10,324 | 13,800 | $X_3$ | $T_3$ |
| 55+ | 156,000 | 4,400 | 5,060 | $X_4$ | $T_4$ |
| Total | 1,000,000 | 32,160 | 46,000 | ??? | 100,000 |

Table 3

As X. is unconstrained and $c_1=1$, $c_2$ is solved only to match the census impression constraints. The highest frequency among each demographic group is the 18-34 23,000 demographic with $$f* = \frac{23,000}{14,323} = 1.605.$$

Therefore, the search space is constrained by:

$$0 \leq c_2 \leq 2.65 \quad \text{(Equation 23)}$$

For each $c_2$ within that interval, the estimated census raw audience sizes $X_k$ and census raw impression counts $T_k$ are calculated using example Equation 22 above, and the $c_2$ is solved such that the total impressions constraint is matched. For completeness, example Equation 24 below represents the $s^{(1)}$ and $s^{(2)}$ variables, which are equivalent to the z-variables defined for the panel.

$$s^{(1)} = \{0.181857, 0.051100, 0.101643, 0.193492\}$$

$$s^{(2)} = \{0.248068, 0.377261, 0.251884, 0.130435\} \quad \text{(Equation 24)}$$

At $c_2*=1.4258$, the values calculated using example Equation 22 above are shown in example Equation 25 below, with X and T rounded for clarity.

$$\hat{f} = \{1.54724, 2.16399, 1.56038, 1.22846\}$$

$$\hat{\sigma} = \{0.0995199, 0.0594798, 0.0569585, 0.0442046\}$$

$$\hat{r} = \{0.0905122, 0.0561405, 0.0538891, 0.0423333\}$$

$$\hat{X} = \{4,978 \ 26,799 \ 16,813 \ 6,604\}$$

$$\hat{T} = \{7,702 \ 57,950 \ 26,235 \ 8,113\} \quad \text{(Equation 25)}$$

At the above $c_2*$ value, the constraint of $$\sum_{k=1}^{K} T_k = T.$$

is satisfied. Example Table 4 below shows the final estimates of the remaining values.

TABLE 4

| | | Third-Party | | Census | |
|---|---|---|---|---|---|
| Demo | Population | Audience | Impressions | Audience | Impressions |
| <18 | 55,000 | 3,113 | 4,140 | 4,978 | 7,702 |
| 18-34 | 477,000 | 14,323 | 23,000 | 26,779 | 57,950 |
| 35-44 | 312,000 | 10,324 | 13,800 | 16,813 | 26,235 |
| 55+ | 156,000 | 4,400 | 5,060 | 6,604 | 8,113 |
| Total | 1,000,000 | 32,160 | 46,000 | 55,174 | 100,000 |

Another example of estimating demographic-based census-level impression counts and audience sizes for census data in accordance with examples disclosed herein for when both X. and T. are known and given is described below based on the example data in example Table 5 below.

TABLE 5

| | | Third-Party | | Census | |
|---|---|---|---|---|---|
| Demo | Population | Audience | Impressions | Audience | Impressions |
| <18 | 5.5% | 3,113 | 4,140 | $X_1$ | $T_1$ |
| 18-34 | 47.7% | 14,323 | 23,000 | $X_2$ | $T_2$ |
| 35-44 | 31.2% | 10,324 | 13,800 | $X_3$ | $T_3$ |
| 55+ | 15.6% | 4,400 | 5,060 | $X_4$ | $T_4$ |
| Total | 100% | 32,160 | 46,000 | 70,000 | 100,000 |

As X. and T. both are constrained, both $c_1$ and $C_2$ must be solved to satisfy the constraints. As the panel data is the same in the above previous example, no re-calculation of those variables are necessary from the previous example, and the search space is constrained by:

$$0 \leq c_1 \leq \infty$$

$$0 \leq c_2 \leq 2.65 \quad \text{(Equation 26)}$$

For completeness, example Equation 27 below represents the $s^{(1)}$ and $s^{(2)}$ variables, which are equivalent to the z-variables defined for the panel.

$$s^{(1)} = \{0.181857, 0.051100, 0.101643, 0.193492\}$$

$$s^{(2)} = \{0.248068, 0.377261, 0.251884, 0.130435\} \quad \text{(Equation 27)}$$

At $\{c_1*, c_2*\} = \{2.27871, 0.996849\}$, the values calculated using example Equation 28 above are shown in example Equation 25 below, with X and T rounded for clarity.

$$\hat{f} = \{1.32853, 1.60275, 1.33527, 1.14946\}$$

$$\hat{\sigma} = \{0.136141, 0.0701853, 0.0776542, 0.0658972\}$$

$$\hat{r} = \{0.119827, 0.0655824, 0.0720586, 0.0618232\}$$

$$\hat{X} = \{6,591 \ 31,283 \ 22,482 \ 9,644\}$$

$$\hat{T} = \{8,756 \ 50,138 \ 30,020 \ 11,086\} \quad \text{(Equation 28)}$$

At the above $\{c_1*, c_2*\}$ value, the constraints of $$\sum_{k=1}^{K} X_k = X.$$

and $$\sum_{k=1}^{K} T_k = T.$$

are both be satisfied. Example Table 6 below shows the final estimates of the remaining values.

TABLE 6

| Demo | Population | Third-Party | | Census | |
|---|---|---|---|---|---|
| | | Audience | Impressions | Audience | Impressions |
| <18 | 55,000 | 3,113 | 4,140 | 6,591 | 8,756 |
| 18-34 | 477,000 | 14,323 | 23,000 | 31,283 | 50,138 |
| 35-44 | 312,000 | 10,324 | 13,800 | 22,482 | 30,020 |
| 55+ | 156,000 | 4,400 | 5,060 | 9,644 | 11,086 |
| Total | 1,000,000 | 32,160 | 46,000 | 70,000 | 100,000 |

Another example of estimating demographic-based census-level impression counts and audience sizes for census data in accordance with examples disclosed herein for a single demographic is described below. While the above examples pertain to multiple demographics, examples disclosed herein may also be implemented as a single demographic version. For a single demographic, examples disclosed herein may be implemented using example Equation 29 below.

$$\frac{A^2}{(R-A)(U-A)} = \frac{X^2}{(T-X)(U-X)} \quad \text{(Equation 29)}$$

Example Equation 29 can be derived as follows based on example Equation 20 above, which is reproduced below.

(Equation 20)

$$\frac{\partial \mathcal{L}}{\partial X_k} = \log\left(\frac{X_k^2}{(T_k - X_k)(U_k - X_k)}\right) - \log\left(\frac{A_k^2}{(R_k - A_k)(U_k - A_k)}\right) - \lambda_1$$

$$\frac{\partial \mathcal{L}}{\partial T_k} = \log\left(1 - \frac{X_k}{T_k}\right) - \log\left(1 - \frac{A_k}{R_k}\right) - \lambda_2$$

When only dealing with a single demographic, the demographic index k can be dropped. Likewise, the Lagrange Multipliers, $\{\mu_1; \lambda_2\}$, are not needed as they relate to matching constraints going across multiple demographics. As this note is for audience estimation, X unknown, only the first equation needs to be solved when equaled to zero, as shown in example Equation 30 below.

(Equation 30)

$$\frac{\partial \mathcal{L}}{\partial X_k} = \log\left(\frac{X^2}{(T-X)(U-X)}\right) - \log\left(\frac{A^2}{(R-A)(U-A)}\right) - \lambda_1$$

Example Equation 31 below represents the example Equation 30 set equal to zero and re-arranged.

$$\log\left(\frac{X^2}{(T-X)(U-K)}\right) = \log\left(\frac{A^2}{(R-A)(U-A)}\right) \quad \text{(Equation 31)}$$

Example Equation 31 above is similar to example Equation 29 above after taking the exponents of both sides. Within the four cases outlined above, example Equation 29 is the single-demographic solution for a case in which X. (total audience size) is unknown and T. (total impressions) is known and given.

Figure 8:
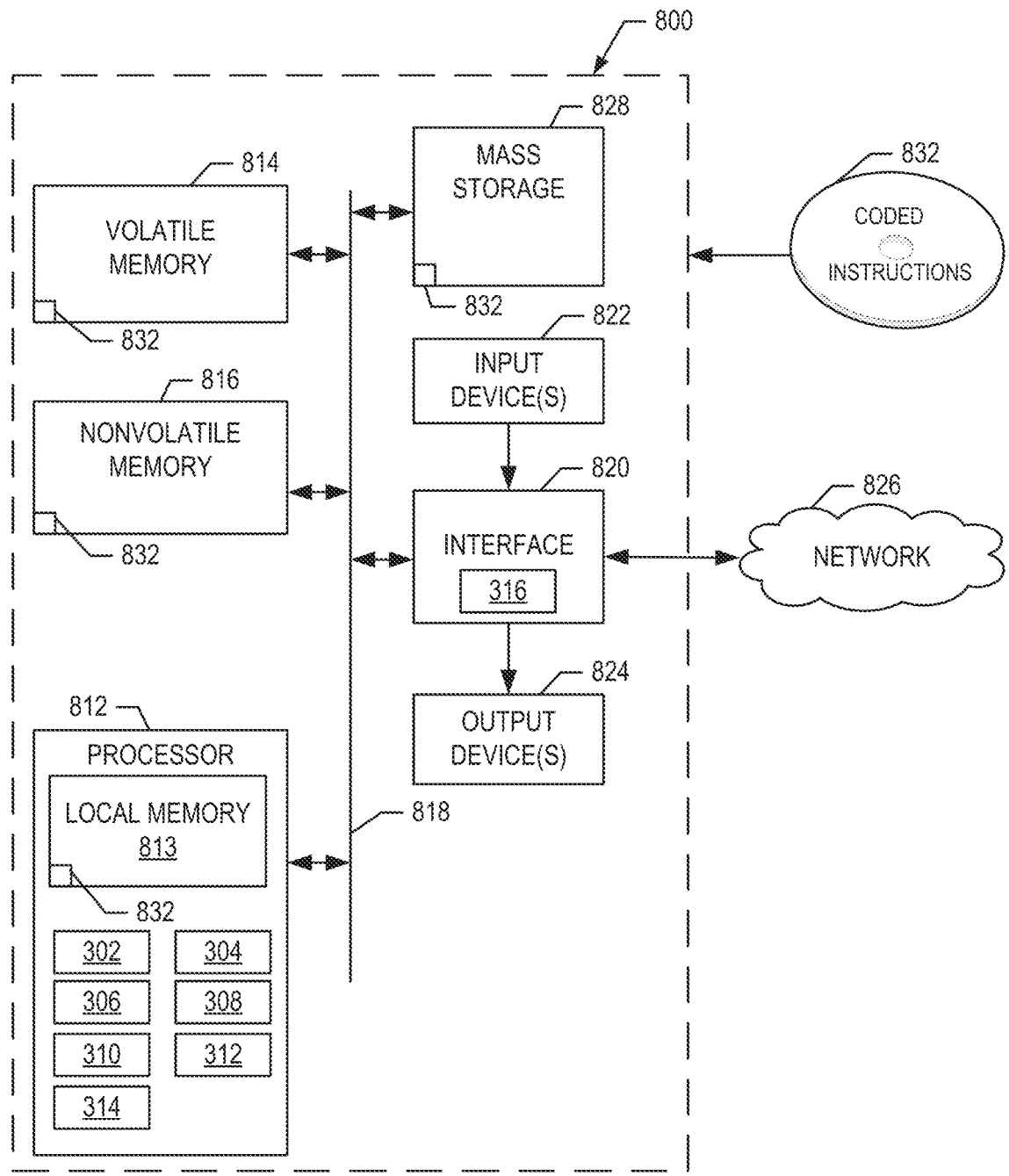
FIG. 8 is a block diagram of an example processing platform structured to execute the instructions represented in FIGS. 4, 5, 6, and/or 7 to implement the example audience metrics generator circuitry of FIGS. 1-3.

FIG. 8 is a block diagram of an example processor platform 800 structured to execute the instructions of FIGS. 4, 5, 6, and 7 to implement the audience metrics generator circuitry 112 of FIGS. 1-3. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example data interface 302, the example constraint calculator circuitry 304, the example value generator circuitry 306, the example verification controller circuitry 308, the example value tester circuitry 310, the example census audience size calculator circuitry 312, and the example census impression count calculator circuitry 314 of FIG. 3.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface. In this example, the interface circuit 820 implements the example communications interface 316 of FIG. 3.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

Example machine executable instructions 832 represented in FIGS. 4, 5, 6, and 7 may be stored in the mass storage device 828, in the volatile memory 814, in the non-volatile memory 816, and/or on a removable non-transitory computer readable storage medium such as a CD or DVD.

Figure 9:
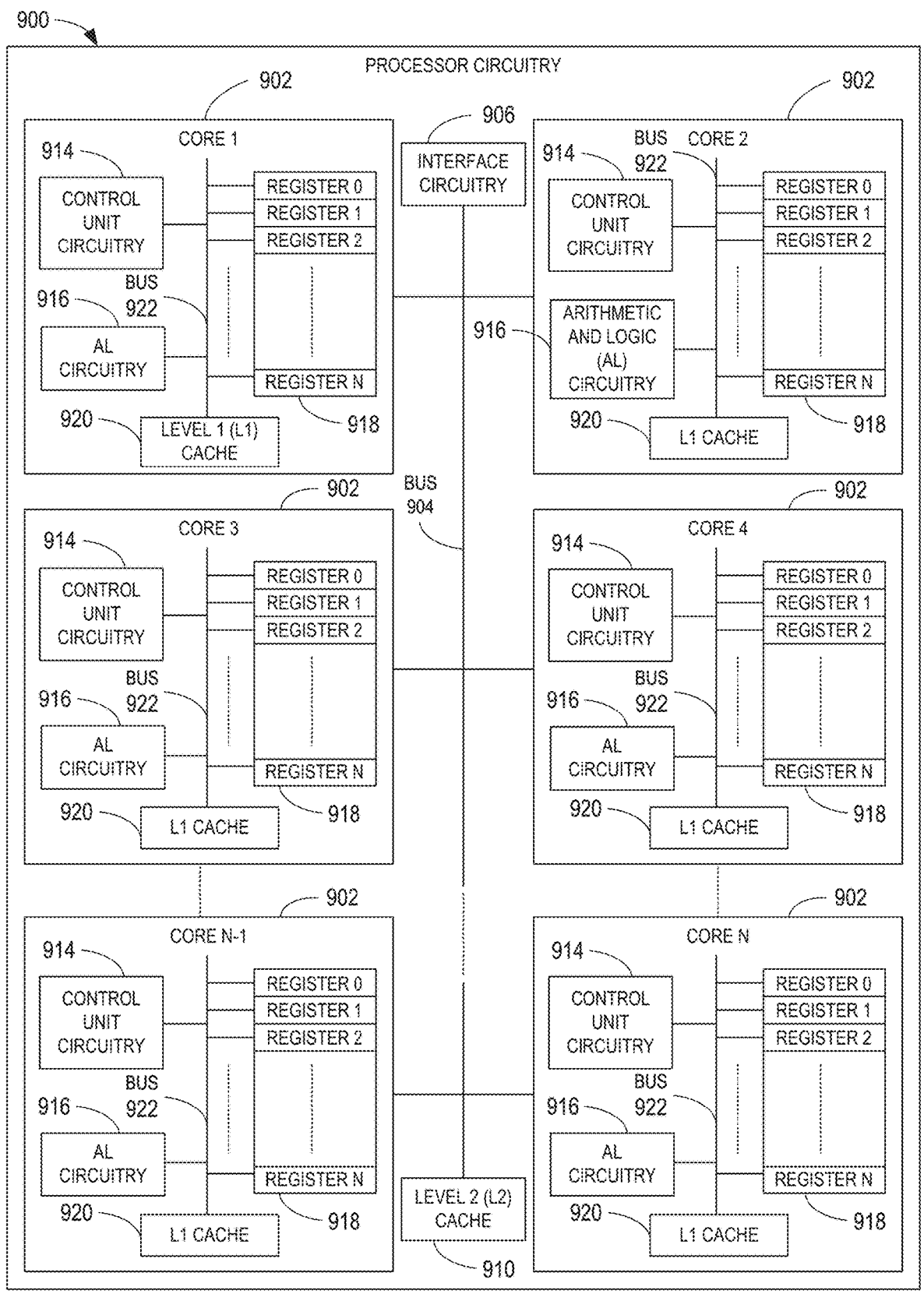
FIG. 9 is a block diagram of an example implementation of the processor circuitry of FIG. 8.

FIG. 9 is a block diagram of an example implementation of the processor circuitry 812 of FIG. 8. In this example, the processor circuitry 812 of FIG. 8 is implemented by a microprocessor 900. For example, the microprocessor 900 may implement multi-core hardware circuitry such as a CPU, a DSP, a GPU, an XPU, etc. Although it may include any number of example cores 902 (e.g., 1 core), the microprocessor 900 of this example is a multi-core semiconductor device including N cores. The cores 902 of the microprocessor 900 may operate independently or may cooperate to execute machine readable instructions. For example, machine code corresponding to a firmware program, an embedded software program, or a software program may be executed by one of the cores 902 or may be executed by multiple ones of the cores 902 at the same or different times. In some examples, the machine code corresponding to the firmware program, the embedded software program, or the software program is split into threads and executed in parallel by two or more of the cores 902. The software program may correspond to a portion or all of the machine readable instructions and/or operations represented by the flowcharts of FIGS. 4, 5, 6, and/or 7.

The cores 902 may communicate by an example bus 904. In some examples, the bus 904 may implement a communication bus to effectuate communication associated with one(s) of the cores 902. For example, the bus 904 may implement at least one of an Inter-Integrated Circuit (I2C) bus, a Serial Peripheral Interface (SPI) bus, a PCI bus, or a PCIe bus. Additionally or alternatively, the bus 904 may implement any other type of computing or electrical bus. The cores 902 may obtain data, instructions, and/or signals from one or more external devices by example interface circuitry 906. The cores 902 may output data, instructions, and/or signals to the one or more external devices by the interface circuitry 906. Although the cores 902 of this example include example local memory 920 (e.g., Level 1 (L1) cache that may be split into an L1 data cache and an L1 instruction cache), the microprocessor 900 also includes example shared memory 910 that may be shared by the cores (e.g., Level 2 (L2_cache)) for high-speed access to data and/or instructions. Data and/or instructions may be transferred (e.g., shared) by writing to and/or reading from the shared memory 910. The local memory 920 of each of the cores 902 and the shared memory 910 may be part of a hierarchy of storage devices including multiple levels of cache memory and the main memory (e.g., the main memory 814, 816 of FIG. 8). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 902 may be referred to as a CPU, DSP, GPU, etc., or any other type of hardware circuitry. Each core 902 includes control unit circuitry 914, arithmetic and logic (AL) circuitry (sometimes referred to as an ALU) 916, a plurality of registers 918, the L1 cache 920, and an example bus 922. Other structures may be present. For example, each core 902 may include vector unit circuitry, single instruction multiple data (SIMD) unit circuitry, load/store unit (LSU) circuitry, branch/jump unit circuitry, floating-point unit (FPU) circuitry, etc. The control unit circuitry 914 includes semiconductor-based circuits structured to control (e.g., coordinate) data movement within the corresponding core 902. The AL circuitry 916 includes semiconductor-based circuits structured to perform one or more mathematic and/or logic operations on the data within the corresponding core 902. The AL circuitry 916 of some examples performs integer based operations. In other examples, the AL circuitry 916 also performs floating point operations. In yet other examples, the AL circuitry 916 may include first AL circuitry that performs integer based operations and second AL circuitry that performs floating point operations. In some examples, the AL circuitry 916 may be referred to as an Arithmetic Logic Unit (ALU). The registers 918 are semiconductor-based structures to store data and/or instructions such as results of one or more of the operations performed by the AL circuitry 916 of the corresponding core 902. For example, the registers 918 may include vector register(s), SIMD register(s), general purpose register(s), flag register(s), segment register(s), machine specific register(s), instruction pointer register(s), control register(s), debug register(s), memory management register(s), machine check register(s), etc. The registers 918 may be arranged in a bank as shown in FIG. 9. Alternatively, the registers 918 may be organized in any other arrangement, format, or structure including distributed throughout the core 902 to shorten access time. The bus 920 may implement at least one of an I2C bus, a SPI bus, a PCI bus, or a PCIe bus Each core 902 and/or, more generally, the microprocessor 900 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 900 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 10:
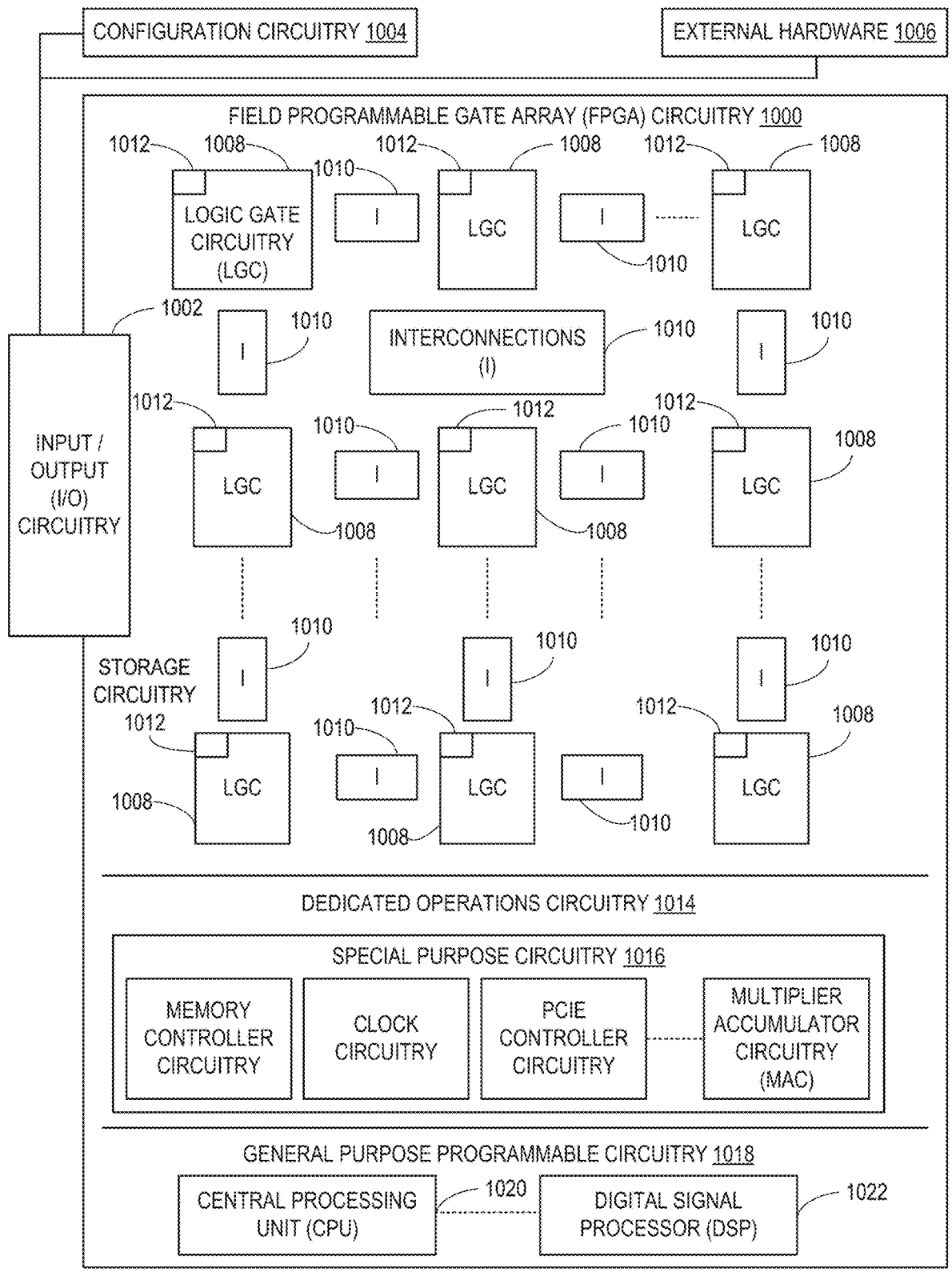
FIG. 10 is a block diagram of another example implementation of the processor circuitry of FIG. 8.

FIG. 10 is a block diagram of another example implementation of the processor circuitry 812 of FIG. 8. In this example, the processor circuitry 812 is implemented by FPGA circuitry 1000. The FPGA circuitry 1000 can be used, for example, to perform operations that could otherwise be performed by the example microprocessor 900 of FIG. 9 executing corresponding machine readable instructions.

However, once configured, the FPGA circuitry 1000 instantiates the machine readable instructions in hardware and, thus, can often execute the operations faster than they could be performed by a general purpose microprocessor executing the corresponding software.

More specifically, in contrast to the microprocessor 900 of FIG. 9 described above (which is a general purpose device that may be programmed to execute some or all of the machine readable instructions represented by the flowcharts of FIGS. 4, 5, 6, and/or 7 but whose interconnections and logic circuitry are fixed once fabricated), the FPGA circuitry 1000 of the example of FIG. 10 includes interconnections and logic circuitry that may be configured and/or interconnected in different ways after fabrication to instantiate, for example, some or all of the machine readable instructions represented by the flowcharts of FIGS. 4, 5, 6, and/or 7. In particular, the FPGA 1000 may be thought of as an array of logic gates, interconnections, and switches. The switches can be programmed to change how the logic gates are interconnected by the interconnections, effectively forming one or more dedicated logic circuits (unless and until the FPGA circuitry 1000 is reprogrammed). The configured logic circuits enable the logic gates to cooperate in different ways to perform different operations on data received by input circuitry. Those operations may correspond to some or all of the software represented by the flowcharts of FIGS. 4, 5, 6, and/or 7. As such, the FPGA circuitry 1000 may be structured to effectively instantiate some or all of the machine readable instructions of the flowcharts of FIGS. 4, 5, 6, and/or 7 as dedicated logic circuits to perform the operations corresponding to those software instructions in a dedicated manner analogous to an ASIC. Therefore, the FPGA circuitry 1000 may perform the operations corresponding to the some or all of the machine readable instructions of FIGS. 4, 5, 6, and/or 7 faster than the general purpose microprocessor can execute the same.

In the example of FIG. 10, the FPGA circuitry 1000 is structured to be programmed (and/or reprogrammed one or more times) by an end user by a hardware description language (HDL) such as Verilog. The FPGA circuitry 1000 of FIG. 10, includes example input/output (I/O) circuitry 1002 to obtain and/or output data to/from example configuration circuitry 1004 and/or external hardware (e.g., external hardware circuitry) 1006. For example, the configuration circuitry 1004 may implement interface circuitry that may obtain machine readable instructions to configure the FPGA circuitry 1000, or portion(s) thereof. In some such examples, the configuration circuitry 1004 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1006 may implement the microprocessor 900 of FIG. 9. The FPGA circuitry 1000 also includes an array of example logic gate circuitry 1008, a plurality of example configurable interconnections 1010, and example storage circuitry 1012. The logic gate circuitry 1008 and interconnections 1010 are configurable to instantiate one or more operations that may correspond to at least some of the machine readable instructions of FIGS. 4, 5, 6, and 7 and/or other desired operations. The logic gate circuitry 1008 shown in FIG. 10 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1008 to enable configuration of the electrical structures and/or the logic gates to form circuits to perform desired operations. The logic gate circuitry 1008 may include other electrical structures such as look-up tables (LUTs), registers (e.g., flip-flops or latches), multiplexers, etc.

The interconnections 1010 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1008 to program desired logic circuits.

The storage circuitry 1012 of the illustrated example is structured to store result(s) of the one or more of the operations performed by corresponding logic gates. The storage circuitry 1012 may be implemented by registers or the like. In the illustrated example, the storage circuitry 1012 is distributed amongst the logic gate circuitry 1008 to facilitate access and increase execution speed.

The example FPGA circuitry 1000 of FIG. 10 also includes example Dedicated Operations Circuitry 1014. In this example, the Dedicated Operations Circuitry 1014 includes special purpose circuitry 1016 that may be invoked to implement commonly used functions to avoid the need to program those functions in the field. Examples of such special purpose circuitry 1016 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1000 may also include example general purpose programmable circuitry 1018 such as an example CPU 1020 and/or an example DSP 1022. Other general purpose programmable circuitry 1018 may additionally or alternatively be present such as a GPU, an XPU, etc., that can be programmed to perform other operations.

Although FIGS. 9 and 10 illustrate two example implementations of the processor circuitry 812 of FIG. 8, many other approaches are contemplated. For example, as mentioned above, modem FPGA circuitry may include an onboard CPU, such as one or more of the example CPU 1020 of FIG. 10. Therefore, the processor circuitry 812 of FIG. 8 may additionally be implemented by combining the example microprocessor 900 of FIG. 9 and the example FPGA circuitry 1000 of FIG. 10. In some such hybrid examples, a first portion of the machine readable instructions represented by the flowcharts of FIGS. 4, 5, 6, and/or 7 may be executed by one or more of the cores 902 of FIG. 9 and a second portion of the machine readable instructions represented by the flowcharts of FIGS. 4, 5, 6, and/or 7 may be executed by the FPGA circuitry 1000 of FIG. 10.

In some examples, the processor circuitry 812 of FIG. 8 may be in one or more packages. For example, the processor circuitry 900 of FIG. 9 and/or the FPGA circuitry 900 of FIG. 9 may be in one or more packages. In some examples, an XPU may be implemented by the processor circuitry 812 of FIG. 8, which may be in one or more packages. For example, the XPU may include a CPU in one package, a DSP in another package, a GPU in yet another package, and an FPGA in still yet another package.

Figure 11:
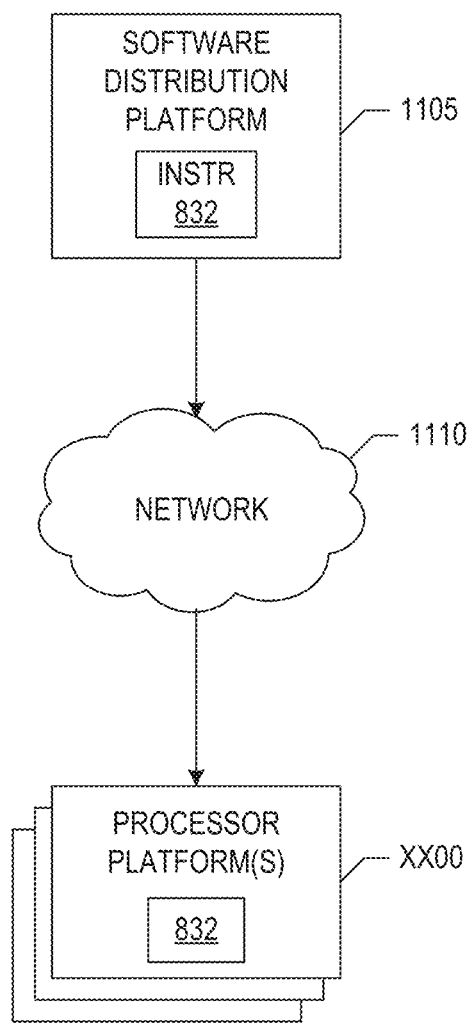
FIG. 11 is a block diagram of an example software distribution platform (e.g., one or more servers) to distribute software (e.g., software corresponding to the example machine readable instructions of FIGS. 4, 5, 6, and/or 7) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1105 to distribute software such as the example machine readable instructions 832 of FIG. 8 to hardware devices owned and/or operated by third parties is illustrated in FIG. 11. The example software distribution platform 1105 may be implemented by any computer server, data facility, cloud service, etc., capable of storing and transmitting software to other computing devices. The third parties may be customers of the entity owning and/or operating the software distribution platform 1105. For example, the entity that owns and/or operates the software distribution platform 1105 may be a developer, a seller, and/or a licensor of software such as the example machine readable instructions 832 of FIG. 8. The third parties may be consumers, users, retailers, OEMs, etc., who purchase and/or license the software for use and/or re-sale and/or sub-licensing. In the illustrated example, the software distribution platform 1105 includes one or more servers and one or more storage devices. The storage devices store the machine readable instructions 832, which may correspond to the example machine readable instructions 400 of FIG. 4, the example machine readable instructions 408 of FIG. 5, the example machine readable instructions 412 of FIG. 6, and the example machine readable instructions 416 of FIG. 7, as described above. The one or more servers of the example software distribution platform 1105 are in communication with a network 1110, which may correspond to any one or more of the Internet and/or any of the example network 826 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 832 from the software distribution platform 1105. For example, the software, which may correspond to the example machine readable instructions 400 of FIG. 4, the example machine readable instructions 408 of FIG. 5, the example machine readable instructions 412 of FIG. 6, and the example machine readable instructions 416 of FIG. 7, may be downloaded to the example processor platform 800, which is to execute the machine readable instructions 832 to implement the audience metrics generator circuitry 112 of FIGS. 1-3. In some example, one or more servers of the software distribution platform 1105 periodically offer, transmit, and/or force updates to the software (e.g., the example machine readable instructions 832 of FIG. 8) to ensure improvements, patches, updates, etc., are distributed and applied to the software at the end user devices.

From the foregoing, it will be appreciated that example methods, apparatus and articles of manufacture have been disclosed that estimate individual demographic level census impression counts and census audience sizes. The disclosed methods, apparatus and articles of manufacture improve the efficiency of using a computing device by using any combination of aggregated total census constraints for the audience sizes and impressions counts. The disclosed methods, apparatus and articles of manufacture at most solve for two unknown parameters independent of the number of demographic categories. The disclosed methods, apparatus and articles of manufacture are accordingly directed to one or more improvement(s) in the functioning of a computer.

Example methods, apparatus, systems, and articles of manufacture to estimate census level impression counts and unique audience sizes across demographics are disclosed herein. Further examples and combinations thereof include the following:

Example 1 includes an apparatus to determine census-based audience metrics of media across multiple demographics, the apparatus comprising audience size calculator circuitry to determine a first census-level audience size based on a database proprietor audience size, a database proprietor impression count, a first one of a plurality of cross-demographic total census audience parameter values, and a first one of a plurality of cross-demographic total census impression parameter values, impression count calculator circuitry to determine a first census-level impression count based on the database proprietor audience size, the database proprietor impression count, the first one of the plurality of cross-demographic total census audience parameter values, and the first one of the plurality of cross-demographic total census impression parameter values, and verification controller circuitry to determine whether the first one of the plurality of cross-demographic total census audience parameter values satisfies a first constraint, determine the first one of the plurality of cross-demographic total census impression parameter values satisfies a second constraint based on the first census-level impression count, and when the first constraint is not satisfied or the second constraint is not satisfied (a) discard the first one of the cross-demographic total census audience parameter values and the first one of the cross-demographic total census impression parameter values, and (b) select a second one of the cross-demographic total census audience parameter values and a second one of the cross-demographic total census impression parameter values, the second one of the cross-demographic total census audience parameter values and the second one of the cross-demographic total census impression parameter values to determine a second census-level audience size and a second census-level impression count.

Example 2 includes the apparatus of example 1, wherein the media is at least one of a webpage, an advertisement, or video.

Example 3 includes the apparatus of example 1, further including value tester circuitry to select the first and second ones of the cross-demographic total census audience parameter values from a first range of values and the first and seconds ones of the cross-demographic total census impression parameter values from a second range of values.

Example 4 includes the apparatus of example 1, wherein the database proprietor audience size and the database proprietor impression count are based on impressions of the media, the impressions attributable to subscribers of a database proprietor.

Example 5 includes the apparatus of example 1, wherein the first census-level audience size corresponds to a first demographic, and the verification controller circuitry is to determine that the first one of the plurality of cross-demographic total census audience parameter values satisfies the first constraint when a sum of the first census-level audience size and a second census-level audience size corresponding to second demographics equals a census-level total audience size.

Example 6 includes the apparatus of example 5, wherein the census-level total audience size is based on first audience sizes logged by an audience measurement entity, the audience measurement entity separate from a database proprietor, the database proprietor to generate the database proprietor audience size and the database proprietor impression count based on second impressions of the media, the second impressions attributable to subscribers of the database proprietor.

Example 7 includes the apparatus of example 1, wherein the first census-level impression count corresponds to a first demographic, and the verification controller circuitry is to determine that the first one of the plurality of cross-demographic total census impression parameter values satisfies the second constraint when a sum of the first census-level impression count and a second census-level impression count corresponding to second demographics equals a census-level total impression count.

Example 8 includes the apparatus of example 7, wherein the census-level total impression count is based on first impressions of the media logged by an audience measurement entity, the audience measurement entity separate from a database proprietor, the database proprietor to generate the database proprietor audience size and the database proprietor impression count based on second impressions of the media, the second impressions attributable to subscribers of the database proprietor.

Example 9 includes an apparatus to determine census-based audience metrics of media across multiple demographics, the apparatus comprising at least one memory, instructions in the apparatus, and processor circuitry to execute the instructions to determine a first census-level audience size based on a database proprietor audience size, a database proprietor impression count, a first one of a plurality of cross-demographic total census audience parameter values, and a first one of a plurality of cross-demographic total census impression parameter values, determine a first census-level impression count based on the database proprietor audience size, the database proprietor impression count, the first one of the plurality of cross-demographic total census audience parameter values, and the first one of the plurality of cross-demographic total census impression parameter values, determine whether the first one of the plurality of cross-demographic total census audience parameter values satisfies a first constraint, determine the first one of the plurality of cross-demographic total census impression parameter values satisfies a second constraint based on the first census-level impression count, and when the first constraint is not satisfied or the second constraint is not satisfied (a) discard the first one of the cross-demographic total census audience parameter values and the first one of the cross-demographic total census impression parameter values, and (b) select a second one of the cross-demographic total census audience parameter values and a second one of the cross-demographic total census impression parameter values, the second one of the cross-demographic total census audience parameter values and the second one of the cross-demographic total census impression parameter values to determine a second census-level audience size and a second census-level impression count.

Example 10 includes the apparatus of example 9, wherein the media is at least one of a webpage, an advertisement, or video.

Example 11 includes the apparatus of example 9, wherein the processor circuitry is to execute the instructions to select the first and second ones of the cross-demographic total census audience parameter values from a first range and the first and seconds ones of the cross-demographic total census impression parameter values from a second range.

Example 12 includes the apparatus of example 9, wherein the database proprietor audience size and the database proprietor impression count are based on impressions of the media, the impressions attributable to subscribers of a database proprietor.

Example 13 includes the apparatus of example 9, wherein the first census-level audience size corresponds to a first demographic, the processor circuitry to execute the instructions to determine that the first one of the plurality of cross-demographic total census audience parameter values satisfies the first constraint when a sum of the first census-level audience size and a second census-level audience size corresponding to second demographics equals a census-level total audience size.

Example 14 includes the apparatus of example 13, wherein the census-level total audience size is based on first audience sizes logged by an audience measurement entity, the audience measurement entity separate from a database proprietor, the database proprietor to generate the database proprietor audience size and the database proprietor impression count based on second impressions of the media, the second impressions attributable to subscribers of the database proprietor.

Example 15 includes the apparatus of example 9, wherein the first census-level impression count corresponds to a first demographic, the processor circuitry to execute the instructions to determine that the first one of the plurality of cross-demographic total census impression parameter values satisfies the second constraint when a sum of the first census-level impression count and a second census-level impression count corresponding to second demographics equals a census-level total impression count.

Example 16 includes the apparatus of example 15, wherein the census-level total impression count is based on first impressions of the media logged by an audience measurement entity, the audience measurement entity separate from a database proprietor, the database proprietor to generate the database proprietor audience size and the database proprietor impression count based on second impressions of the media, the second impressions attributable to subscribers of the database proprietor.

Example 17 includes a non-transitory computer readable storage medium comprising instructions that, when executed, cause at least one processor to at least determine a first census-level audience size based on a database proprietor audience size, a database proprietor impression count, a first one of a plurality of cross-demographic total census audience parameter values, and a first one of a plurality of cross-demographic total census impression parameter values, determine a first census-level impression count based on the database proprietor audience size, the database proprietor impression count, the first one of the plurality of cross-demographic total census audience parameter values, and the first one of the plurality of cross-demographic total census impression parameter values, determine whether the first one of the plurality of cross-demographic total census audience parameter values satisfies a first constraint, determine the first one of the plurality of cross-demographic total census impression parameter values satisfies a second constraint based on the first census-level impression count, and when the first constraint is not satisfied or the second constraint is not satisfied (a) discard the first one of the cross-demographic total census audience parameter values and the first one of the cross-demographic total census impression parameter values, and (b) select a second one of the cross-demographic total census audience parameter values and a second one of the cross-demographic total census impression parameter values, the second one of the cross-demographic total census audience parameter values and the second one of the cross-demographic total census impression parameter values to determine a second census-level audience size and a second census-level impression count.

Example 18 includes the non-transitory computer readable storage medium of example 17, wherein the media is at least one of a webpage, an advertisement, or video.

Example 19 includes the non-transitory computer readable storage medium of example 17, wherein the instructions are further to cause the at least one processor to select the first and second ones of the cross-demographic total census audience parameter values from a first range and the first and seconds ones of the cross-demographic total census impression parameter values from a second range.

Example 20 includes the non-transitory computer readable storage medium of example 17, wherein the database proprietor audience size and the database proprietor impression count are based on impressions of the media, the impressions attributable to subscribers of a database proprietor.

Example 21 includes the non-transitory computer readable storage medium of example 17, wherein the first census-level audience size corresponds to a first demographic, the instructions are further to cause the at least one processor to determine that the first one of the plurality of cross-demographic total census audience parameter values satisfies the first constraint when a sum of the first census-level audience size and a second census-level audience size corresponding to second demographics equals a census-level total audience size.

Example 22 includes the non-transitory computer readable storage medium of example 21, wherein the census-level total audience size is based on first audience sizes logged by an audience measurement entity, the audience measurement entity separate from a database proprietor, the database proprietor to generate the database proprietor audience size and the database proprietor impression count based on second impressions of the media, the second impressions attributable to subscribers of the database proprietor.

Example 23 includes the non-transitory computer readable storage medium of example 17, wherein the first census-level impression count corresponds to a first demographic, the instructions are further to cause the at least one processor to determine that the first one of the plurality of cross-demographic total census impression parameter values satisfies the second constraint when a sum of the first census-level impression count and a second census-level impression count corresponding to second demographics equals a census-level total impression count.

Example 24 includes the non-transitory computer readable storage medium of example 23, wherein the census-level total impression count is based on first impressions of the media logged by an audience measurement entity, the audience measurement entity separate from a database proprietor, the database proprietor to generate the database proprietor audience size and the database proprietor impression count based on second impressions of the media, the second impressions attributable to subscribers of the database proprietor.

Example 25 includes a method to determine census-based audience metrics of media across multiple demographics, the method comprising determining, by executing an instruction with a processor, a first census-level audience size based on a database proprietor audience size, a database proprietor impression count, a first one of a plurality of cross-demographic total census audience parameter values, and a first one of a plurality of cross-demographic total census impression parameter values, determining, by executing an instruction with the processor, a first census-level impression count based on the database proprietor audience size, the database proprietor impression count, the first one of the plurality of cross-demographic total census audience parameter values, and the first one of the plurality of cross-demographic total census impression parameter values, and determining, by executing an instruction with the processor, whether the first one of the plurality of cross-demographic total census audience parameter values satisfies a first constraint, determining, by executing an instruction with the processor, the first one of the plurality of cross-demographic total census impression parameter values satisfies a second constraint based on the first census-level impression count, and when the first constraint is not satisfied or the second constraint is not satisfied (a) discarding, by executing an instruction with the processor, the first one of the cross-demographic total census audience parameter values and the first one of the cross-demographic total census impression parameter values, and (b) selecting, by executing an instruction with the processor, a second one of the cross-demographic total census audience parameter values and a second one of the cross-demographic total census impression parameter values, the second one of the cross-demographic total census audience parameter values and the second one of the cross-demographic total census impression parameter values to determine a second census-level audience size and a second census-level impression count.

Example 26 includes the method of example 25, wherein the media is at least one of a webpage, an advertisement, or video.

Example 27 includes the method of example 25, further including selecting the first and second ones of the cross-demographic total census audience parameter values from a first range and the first and seconds ones of the cross-demographic total census impression parameter values from a second range.

Example 28 includes the method of example 25, wherein the database proprietor audience size and the database proprietor impression count are based on impressions of the media, the impressions attributable to subscribers of a database proprietor.

Example 29 includes the method of example 25, wherein the first census-level audience size corresponds to a first demographic, and further including determining that the first one of the plurality of cross-demographic total census audience parameter values satisfies the first constraint when a sum of the first census-level audience size and a second census-level audience size corresponding to second demographics equals a census-level total audience size.

Example 30 includes the method of example 29, wherein the census-level total audience size is based on first audience sizes logged by an audience measurement entity, the audience measurement entity separate from a database proprietor, the database proprietor to generate the database proprietor audience size and the database proprietor impression count based on second impressions of the media, the second impressions attributable to subscribers of the database proprietor.

Example 31 includes the method of example 25, wherein the first census-level impression count corresponds to a first demographic, and further including determining that the first one of the plurality of cross-demographic total census impression parameter values satisfies the second constraint when a sum of the first census-level impression count and a second census-level impression count corresponding to second demographics equals a census-level total impression count.

Example 32 includes the method of example 31, wherein the census-level total impression count is based on first impressions of the media logged by an audience measurement entity, the audience measurement entity separate from a database proprietor, the database proprietor to generate the database proprietor audience size and the database proprietor impression count based on second impressions of the media, the second impressions attributable to subscribers of the database proprietor.

Example 33 includes an apparatus to determine census-based audience metrics of media across multiple demographics, the apparatus comprising at least one memory, and processor circuitry including one or more of at least one of a central processing unit, a graphic processing unit or a digital signal processor, the at least one of the central processing unit, the graphic processing unit or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or Application Specific Integrate Circuitry including logic gate circuitry to perform one or more third operations, the processor circuitry to at least one of perform at least one of the first operations, the second operations or the third operations to determine a first census-level audience size based on a database proprietor audience size, a database proprietor impression count, a first one of a plurality of cross-demographic total census audience parameter values, and a first one of a plurality of cross-demographic total census impression parameter values, determine a first census-level impression count based on the database proprietor audience size, the database proprietor impression count, the first one of the plurality of cross-demographic total census audience parameter values, and the first one of the plurality of cross-demographic total census impression parameter values, determine whether the first one of the plurality of cross-demographic total census audience parameter values satisfies a first constraint, determine the first one of the plurality of cross-demographic total census impression parameter values satisfies a second constraint based on the first census-level impression count, and when the first constraint is not satisfied or the second constraint is not satisfied (a) discard the first one of the cross-demographic total census audience parameter values and the first one of the cross-demographic total census impression parameter values, and (b) select a second one of the cross-demographic total census audience parameter values and a second one of the cross-demographic total census impression parameter values, the second one of the cross-demographic total census audience parameter values and the second one of the cross-demographic total census impression parameter values to determine a second census-level audience size and a second census-level impression count.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus to determine census-based audience metrics of media across multiple demographics, the apparatus comprising:

an interface to access a database proprietor audience size and database proprietor impression count via a network transmission from a database proprietor;

audience size calculator circuitry to:
  determine an estimated frequency of impressions based on (1) a first ratio of the database proprietor audience size to a database proprietor impression count, and (2) a first one of a plurality of cross-demographic total census impression parameter values;
  determine a probability of a demographic being in an audience based on a first product of (1) a first one of a plurality of cross-demographic total census audience parameter values, (2) a second ratio of the database proprietor audience size squared to a second product of a first difference between a universe estimate and the database proprietor audience size and a second difference between the database proprietor impression count and the database proprietor audience size, and (3) a third difference between one and the estimated frequency of impressions;
  determine an audience universe estimate based a third ratio of the probability of the demographic being in the audience to a first sum of one and the probability of the demographic begin in the audience; and
  determine a first census-level audience size based on a product of the audience universe estimate and the universe estimate;

impression count calculator circuitry to determine a first census-level impression count based on the database proprietor audience size, the database proprietor impression count, the first one of the plurality of cross-demographic total census audience parameter values, and the first one of the plurality of cross-demographic total census impression parameter values; and verification controller circuitry to:
  determine whether the first one of the plurality of cross-demographic total census audience parameter values satisfies a first constraint, the first constraint based on a total audience count;
  determine whether the first one of the plurality of cross-demographic total census impression parameter values satisfies a second constraint, the second constraint based on a total impression count; and
  after a determination that the first constraint is not satisfied or the second constraint is not satisfied: (a) discard the first one of the cross-demographic total census audience parameter values and the first one of the cross-demographic total census impression parameter values, and (b) determine a second census-level audience size and a second census-level impression count that provide an improved accuracy relative to the first census-level audience size and the first census-level impression count by (1) selecting a second one of the cross-demographic total census audience parameter values and a second one of the cross-demographic total census impression parameter values, and (2) determining that the first one of the cross-demographic total census audience parameter values satisfies the first constraint and the second one of the cross-demographic total census impression parameter values satisfies the second constraint, wherein the audience size calculator circuitry is to determine the first census-level audience size and the second census-level audience size according to:

$$f_k = (1 - c_2 s_k^{(2)})^{-1}$$
$$o_k = c_1 s_k^{(1)}(f_k - 1)$$
$$r_k = \frac{o_k}{1 + o_k}$$
$$X_k = r_k U_k$$
$$T_k = f_k X_k$$
$$s_k^{(1)} = \frac{A_k^2}{(R_k - A_k)(U_k - A_k)}$$
$$s_k^{(2)} = 1 - \frac{A_k^{\square}}{R_k}$$

wherein $f_k$ is the estimated frequency of impressions, $c_2$ is the corresponding one of the plurality of cross-demographic total census impression parameter values, $$s_k^{(2)}$$

is a first quantity based on the first ratio, $o_k$ is the probability of a demographic being in an audience, $c_1$ is the corresponding one of the plurality of cross-demographic total census audience parameter values, $$s_k^{(1)}$$

is a second quantity based on the second ratio, $r_k$ is the audience universe estimate, $X_k$ is the corresponding census-level audience size, $U_k$ is the universe estimate, $T_k$ is the corresponding census-level impression count, $A_k$, is the database proprietor audience size, and $R_k$ is the database proprietor impression count.

2. The apparatus of claim 1, wherein the media is at least one of a webpage, an advertisement, or video.

3. The apparatus of claim 1, further including value tester circuitry to select the first and second ones of the cross-demographic total census audience parameter values from a first range of values and the first and second ones of the cross-demographic total census impression parameter values from a second range of values.

4. The apparatus of claim 1, wherein the database proprietor audience size and the database proprietor impression count are based on impressions of the media, the impressions attributable to subscribers of a database proprietor.

5. The apparatus of claim 1, wherein the first census-level audience size corresponds to a first demographic, and the verification controller circuitry is to determine that the first one of the plurality of cross-demographic total census audience parameter values satisfies the first constraint when a second sum of the first census-level audience size and a third census-level audience size equals a census-level total audience size, the third census level audience size corresponding to second demographics.

6. The apparatus of claim 5, wherein the census-level total audience size is based on first audience sizes logged by an audience measurement entity, the audience measurement entity separate from a database proprietor, the database proprietor to generate the database proprietor audience size and the database proprietor impression count based on impressions of the media, the impressions attributable to subscribers of the database proprietor.

7. The apparatus of claim 1, wherein the first census-level impression count corresponds to a first demographic, and the verification controller circuitry is to determine that the first one of the plurality of cross-demographic total census impression parameter values satisfies the second constraint when a second sum of the first census-level impression count and a third census-level impression count equals a census-level total impression count, the third census-level impression count corresponding to second demographics.

8. The apparatus of claim 7, wherein the census-level total impression count is based on first impressions of the media logged by an audience measurement entity, the audience measurement entity separate from a database proprietor, the database proprietor to generate the database proprietor audience size and the database proprietor impression count based on impressions of the media, the impressions attributable to subscribers of the database proprietor.

9. An apparatus to determine census-based audience metrics of media across multiple demographics, the apparatus comprising:
at least one memory;
instructions in the apparatus; and
processor circuitry to execute the instructions to:
  access a database proprietor audience size and database proprietor impression count received in a network transmission from a database proprietor;
  determine an estimated frequency of impressions based on (1) a first ratio of the database proprietor audience size to a database proprietor impression count, and (2) a first one of a plurality of cross-demographic total census impression parameter values;
  determine a probability of a demographic being in an audience based on a first product of (1) a first one of a plurality of cross-demographic total census audience parameter values, (2) a second ratio of the database proprietor audience size squared to a second product of a first difference between a universe estimate and the database proprietor audience size and a second difference between the database proprietor impression count and the database proprietor audience size, and (3) a third difference between one and the estimated frequency of impressions;
  determine an audience universe estimate based a third ratio of the probability of the demographic being in the audience to a first sum of one and the probability of the demographic begin in the audience; and
  determine a first census-level audience size based on a third product of the audience universe estimate and the universe estimate;
  determine a first census-level impression count based on the database proprietor audience size, the database proprietor impression count, the first one of the plurality of cross-demographic total census audience parameter values, and the first one of the plurality of cross-demographic total census impression parameter values;
  determine whether the first one of the plurality of cross-demographic total census audience parameter values satisfies a first constraint, the first constraint based on a total audience count;
  determine whether the first one of the plurality of cross-demographic total census impression parameter values satisfies a second constraint, the second constraint based on the total impression count; and after a determination that the first constraint is not satisfied or the second constraint is not satisfied: (a) discard the first one of the cross-demographic total census audience parameter values and the first one of the cross-demographic total census impression parameter values, and (b) determine a second census-level audience size and a second census-level impression count that provide an improved accuracy relative to the first census-level audience size and the first census-level impression count by (1) selecting a second one of the cross-demographic total census audience parameter values and a second one of the cross-demographic total census impression parameter values, and (2) determining that the first one of the cross-demographic total census audience parameter values satisfies the first constraint and the second one of the cross-demographic total census impression parameter values satisfies the second constraint, wherein processor circuitry is to execute the instructions to determine the first census-level audience size and the second census-level audience size according to:

$$f_k = (1 - c_2 s_k^{(2)})^{-1}$$

$$o_k = c_1 s_k^{(1)} (f_k - 1)$$

$$r_k = \frac{o_k}{1 + o_k}$$

$$X_k = r_k U_k$$

$$T_k = f_k X_k$$

$$s_k^{(1)} = \frac{A_k^2}{(R_k - A_k)(U_k - A_k)}$$

$$s_k^{(2)} = 1 - \frac{A_k^2}{R_k}$$

wherein $f_k$ is the estimated frequency of impressions, $c_2$ is the corresponding one of the plurality of cross-demographic total census impression parameter values, $$s_k^{(2)}$$

is a first quantity based on the first ratio, $O_k$ is the probability of a demographic being in an audience, $c_1$ is the corresponding one of the plurality of cross-demographic total census audience parameter values, $$s_k^{(1)}$$

is a second quantity based on the second ratio, $r_k$ is the audience universe estimate, $X_k$ is the corresponding census-level audience size, $U_k$ is the universe estimate, $T_k$ is the corresponding census-level impression count, $A_k$, is the database proprietor audience size, and $R_k$ is the database proprietor impression count.

10. The apparatus of claim 9, wherein the processor circuitry is to execute the instructions to select the first and second ones of the cross-demographic total census audience parameter values from a first range and the first and second ones of the cross-demographic total census impression parameter values from a second range.

11. The apparatus of claim 9, wherein the first census-level audience size corresponds to a first demographic, the processor circuitry to execute the instructions to determine that the first one of the plurality of cross-demographic total census audience parameter values satisfies the first constraint when a second sum of the first census-level audience size and a third census-level audience size equals a census-level total audience size, the third census-level audience size corresponding to second demographics.

12. The apparatus of claim 11, wherein the census-level total audience size is based on first audience sizes logged by an audience measurement entity, the audience measurement entity separate from a database proprietor, the database proprietor to generate the database proprietor audience size and the database proprietor impression count based on impressions of the media, the impressions attributable to subscribers of the database proprietor.

13. The apparatus of claim 9, wherein the first census-level impression count corresponds to a first demographic, the processor circuitry to execute the instructions to determine that the first one of the plurality of cross-demographic total census impression parameter values satisfies the second constraint when a second sum of the first census-level impression count and a third census-level impression count equals a census-level total impression count, the third census-level impression count corresponding to second demographics.

14. The apparatus of claim 13, wherein the census-level total impression count is based on first impressions of the media logged by an audience measurement entity, the audience measurement entity separate from a database proprietor, the database proprietor to generate the database proprietor audience size and the database proprietor impression count based on impressions of the media, the impressions attributable to subscribers of the database proprietor.

15. A non-transitory computer readable storage medium comprising instructions to cause programmable circuitry to at least:

access a database proprietor audience size and database proprietor impression count received in a network transmission from a database proprietor;

determine an estimated frequency of impressions based on (1) a first ratio of the database proprietor audience size to a database proprietor impression count, and (2) a first one of a plurality of cross-demographic total census impression parameter values;

determine a probability of a demographic being in an audience based on a first product of (1) a first one of a plurality of cross-demographic total census audience parameter values, (2) a second ratio of the database proprietor audience size squared to a second product of a first difference between a universe estimate and the database proprietor audience size and a second difference between the database proprietor impression count and the database proprietor audience size, and (3) a third difference between one and the estimated frequency of impressions;

determine an audience universe estimate based a third ratio of the probability of the demographic being in the audience to a first sum of one and the probability of the demographic begin in the audience; and determine a first census-level audience size based on a third product of the audience universe estimate and the universe estimate;

determine a first census-level impression count based on the database proprietor audience size, the database proprietor impression count, the first one of the plurality of cross-demographic total census audience parameter values, and the first one of the plurality of cross-demographic total census impression parameter values;

determine whether the first one of the plurality of cross-demographic total census audience parameter values satisfies a first constraint, the first constraint based on a total audience count;

determine whether the first one of the plurality of cross-demographic total census impression parameter values satisfies a second constraint, the second constraint based on the total impression count; and after a determination that the first constraint is not satisfied or the second constraint is not satisfied: (a) discard the first one of the cross-demographic total census audience parameter values and the first one of the cross-demographic total census impression parameter values, and (b) determine a second census-level audience size and a second census-level impression count that provide an improved accuracy relative to the first census-level audience size and the first census-level impression count by (1) selecting a second one of the cross-demographic total census audience parameter values and a second one of the cross-demographic total census impression parameter values, and (2) determining that the first one of the cross-demographic total census audience parameter values satisfies the first constraint and the second one of the cross-demographic total census impression parameter values satisfies the second constraint, wherein the instructions are to further cause the programmable circuitry to determine the first census-level audience size and the second census-level audience size according to:

$$f_k = \left(1 - c_2 s_k^{(2)}\right)^{-1}$$
$$o_k = c_1 s_k^{(1)}(f_k - 1)$$
$$r_k = \frac{o_k}{1 + o_k}$$
$$X_k = r_k U_k$$
$$T_k = f_k X_k$$
$$s_k^{(1)} = \frac{A_k^2}{(R_k - A_k)(U_k - A_k)}$$
$$s_k^{(2)} = 1 - \frac{A_k}{R_k}$$

wherein $f_k$ is the estimated frequency of impressions, $c_2$ is the first one of the plurality of cross-demographic total census impression parameter values, $$s_k^{(2)}$$

is a first quantity based on the first ratio, $o_k$ is the probability of a demographic being in an audience, $c_j$ is the first one of the plurality of cross-demographic total census audience parameter values, $$s_k^{(1)}$$

is a second quantity based on the second ratio, $r_k$ is the audience universe estimate, $X_k$ is the corresponding census-level audience size, $U_k$ is the universe estimate, $T_k$ is the corresponding census-level impression count, $A_k$, is the database proprietor audience size, and $R_k$ is the database proprietor impression count.

16. The non-transitory computer readable storage medium of claim 15, wherein the instructions are further to cause the programmable circuitry to select the first and second ones of the cross-demographic total census audience parameter values from a first range and the first and second ones of the cross-demographic total census impression parameter values from a second range.

17. The non-transitory computer readable storage medium of claim 15, wherein the first census-level audience size corresponds to a first demographic, the instructions are further to cause the programmable circuitry to determine that the first one of the plurality of cross-demographic total census audience parameter values satisfies the first constraint when a sum of the first census-level audience size and a third census-level audience size equals a census-level total audience size, the third census-level audience size corresponding to second demographics.

18. The non-transitory computer readable storage medium of claim 17, wherein the census-level total audience size is based on first audience sizes logged by an audience measurement entity, the audience measurement entity separate from a database proprietor, the database proprietor to generate the database proprietor audience size and the database proprietor impression count based on impressions of media, the impressions attributable to subscribers of the database proprietor.

19. The non-transitory computer readable storage medium of claim 15, wherein the first census-level impression count corresponds to a first demographic, the instructions are further to cause the programmable circuitry to determine that the first one of the plurality of cross-demographic total census impression parameter values satisfies the second constraint when a sum of the first census-level impression count and a third census-level impression count equals a census-level total impression count, the third census-level impression count corresponding to second demographics.

20. The non-transitory computer readable storage medium of claim 19, wherein the census-level total impression count is based on first impressions of media logged by an audience measurement entity, the audience measurement entity separate from a database proprietor, the database proprietor to generate the database proprietor audience size and the database proprietor impression count based on impressions of the media, the impressions attributable to subscribers of the database proprietor.

* * * * *